US010375943B2

(12) United States Patent
Murray et al.

(10) Patent No.: US 10,375,943 B2
(45) Date of Patent: Aug. 13, 2019

(54) EXPANDABLE PORTABLE TACKLE CONTAINER AND TIPPET DISPENSING METHOD AND DEVICE

(71) Applicant: Copper Creek Fly Fishing, LLC., Farr West, UT (US)

(72) Inventors: Trevor Dalling Murray, Ogden, UT (US); Clint Bodily McFarland, Hooper, UT (US)

(73) Assignee: Copper Creek Fly Fishing, LLC, Farr West, UT (US)

( * ) Notice: Subject to any disclaimer, the term of this patent is extended or adjusted under 35 U.S.C. 154(b) by 0 days.

(21) Appl. No.: 15/670,210

(22) Filed: Aug. 7, 2017

(65) Prior Publication Data

US 2018/0014521 A1   Jan. 18, 2018

Related U.S. Application Data

(63) Continuation of application No. 14/463,258, filed on Aug. 19, 2014, now Pat. No. 9,723,826.

(60) Provisional application No. 61/869,397, filed on Aug. 23, 2013.

(51) Int. Cl.
| *A01K 97/06* | (2006.01) |
| *A45F 3/04* | (2006.01) |
| *A45F 5/02* | (2006.01) |
| *A45F 3/00* | (2006.01) |

(52) U.S. Cl.
CPC .............. *A01K 97/06* (2013.01); *A45F 3/005* (2013.01); *A45F 3/04* (2013.01); *A45F 5/02* (2013.01); *A45F 2003/002* (2013.01)

(58) Field of Classification Search
CPC . A01K 97/06; A45F 3/005; A45F 5/02; A45F 3/04; A45F 2003/002
USPC ............ 43/54.1; 206/315.11; 224/920, 588.1
See application file for complete search history.

(56) References Cited

U.S. PATENT DOCUMENTS

| 2,539,302 | A | * | 1/1951 | Fye ........................ | A01K 97/06 190/16 |
| 3,948,579 | A | * | 4/1976 | Schirmer ............... | A01K 97/06 312/111 |
| 5,042,193 | A | * | 8/1991 | Steiner ................... | A01K 97/06 206/315.11 |
| 5,505,354 | A | * | 4/1996 | Hutton ................... | A01K 97/06 206/315.11 |
| D383,897 | S | * | 9/1997 | Hare ............................. | D3/260 |
| 5,687,928 | A | * | 11/1997 | Lassiter ................. | B65H 49/24 242/129.5 |
| 6,427,377 | B1 | * | 8/2002 | Kim ....................... | A01K 97/06 43/4 |
| 2003/0037480 | A1 | * | 2/2003 | Davis ..................... | A01K 97/06 43/54.1 |

(Continued)

*Primary Examiner* — Cassandra Davis
(74) *Attorney, Agent, or Firm* — Ascentage Patent Law, LLC; Travis Lee Johnson

(57) ABSTRACT

The present disclosure relates to methods and device for carrying fishing equipment and accessories and for dispensing tippet or leader from a tackle container. In at least one embodiment the portable container comprises a first housing and a second housing that are pivotably connected. Each of the housings can be configured so as to define a plurality of hollow spaces therein, wherein at least one hollow space includes a tippet control system. In additional embodiments, the portable container can further include one or more expansion housings.

15 Claims, 23 Drawing Sheets

(56) References Cited

U.S. PATENT DOCUMENTS

| | | | |
|---|---|---|---|
| 2009/0223971 A1* | 9/2009 | Moffett | B25H 3/023 220/500 |
| 2012/0151819 A1* | 6/2012 | Solis | A01K 97/00 43/54.1 |

* cited by examiner

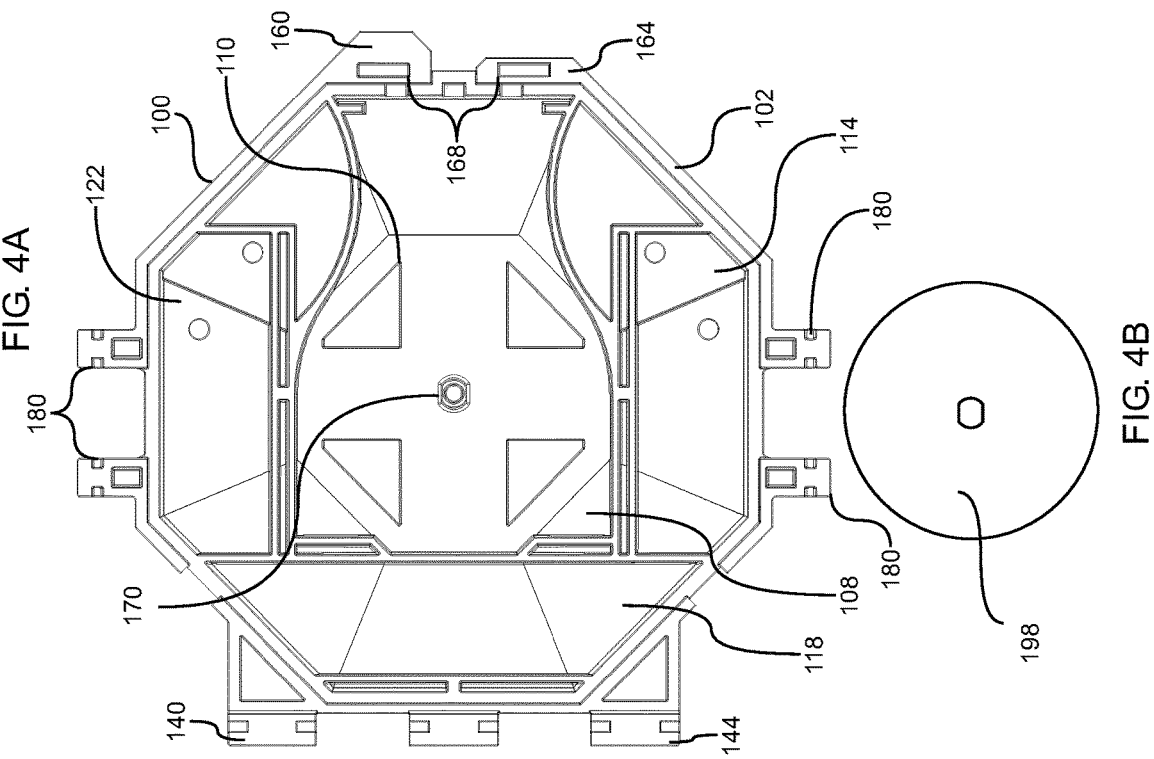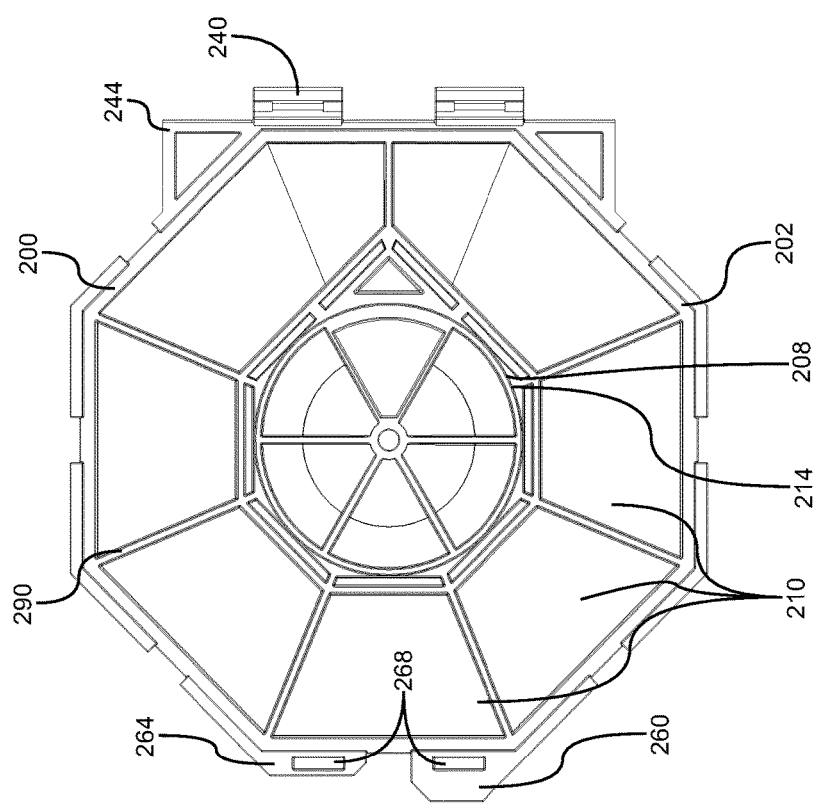

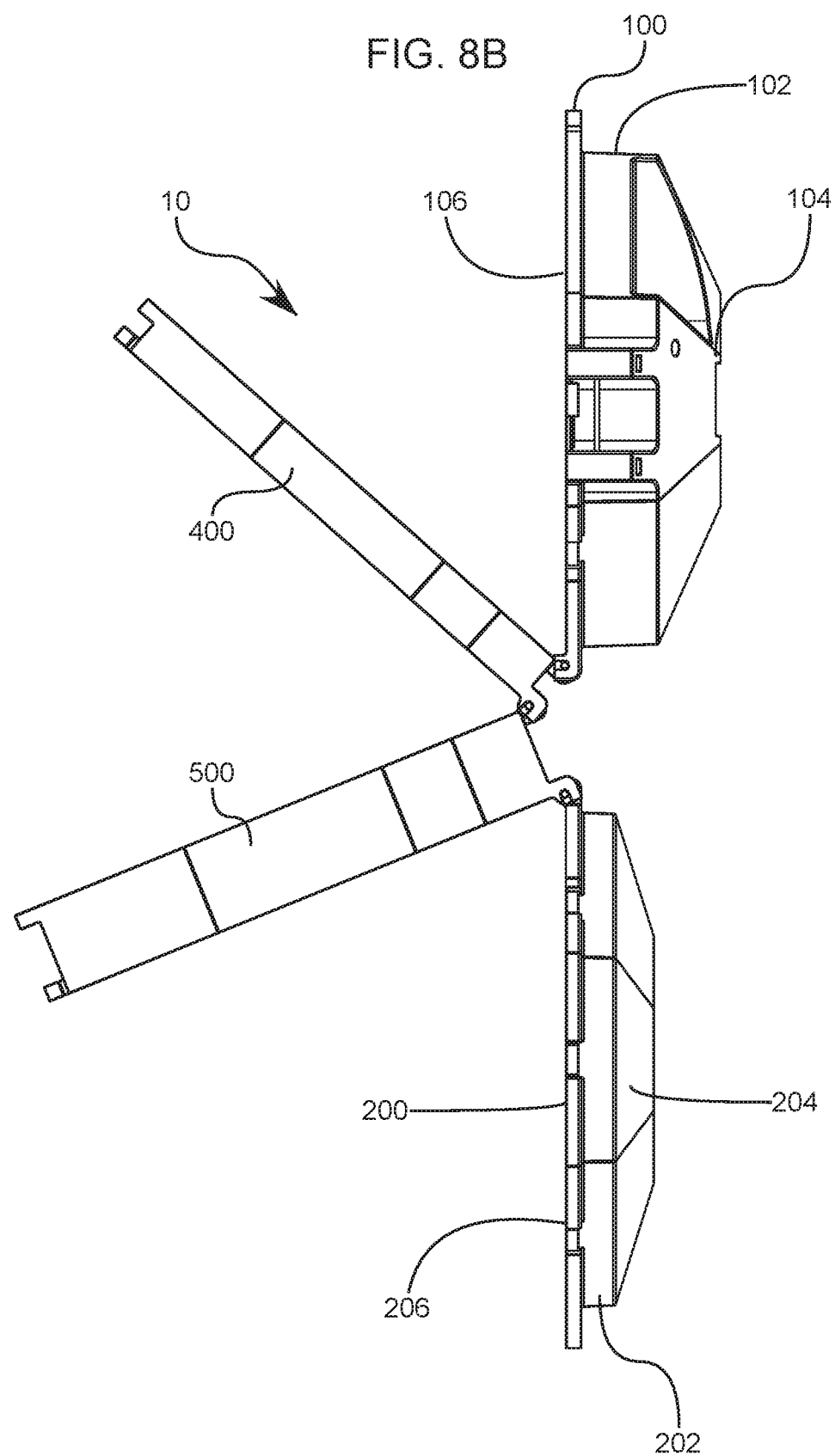

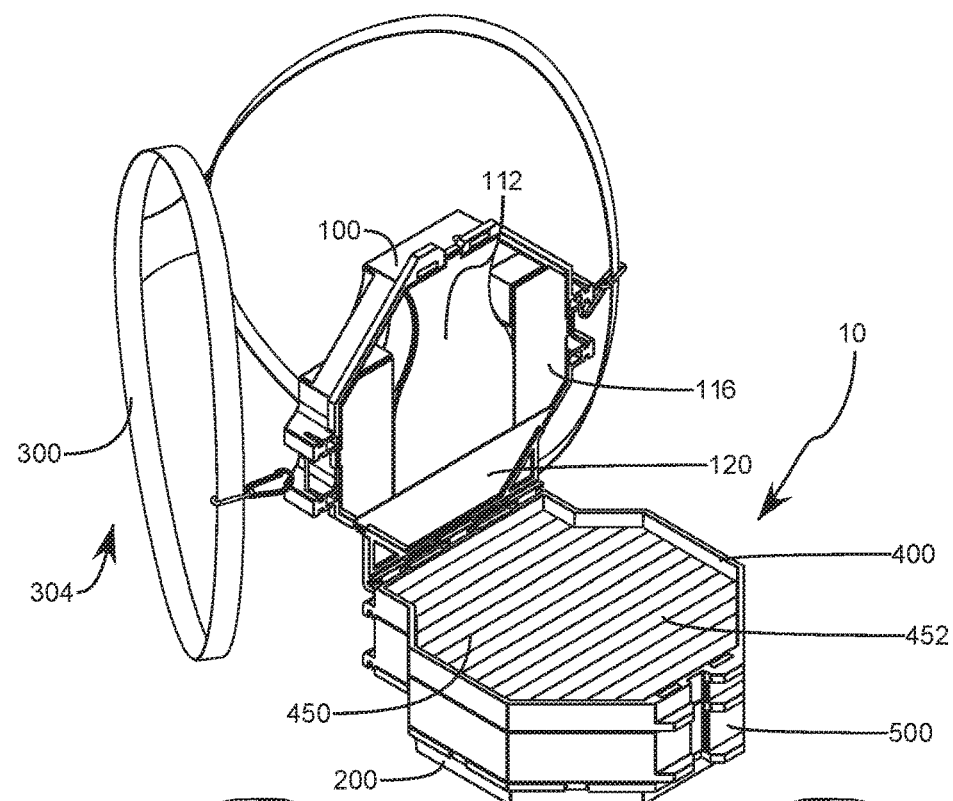
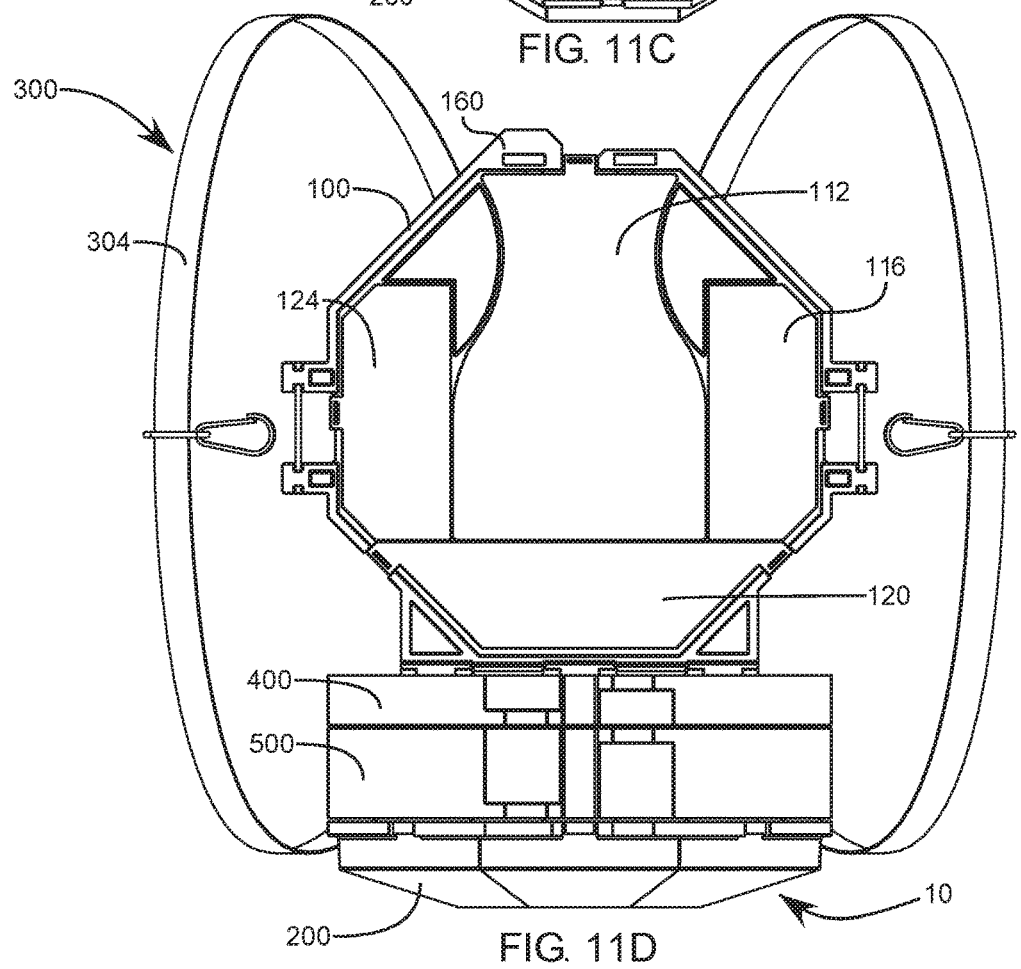

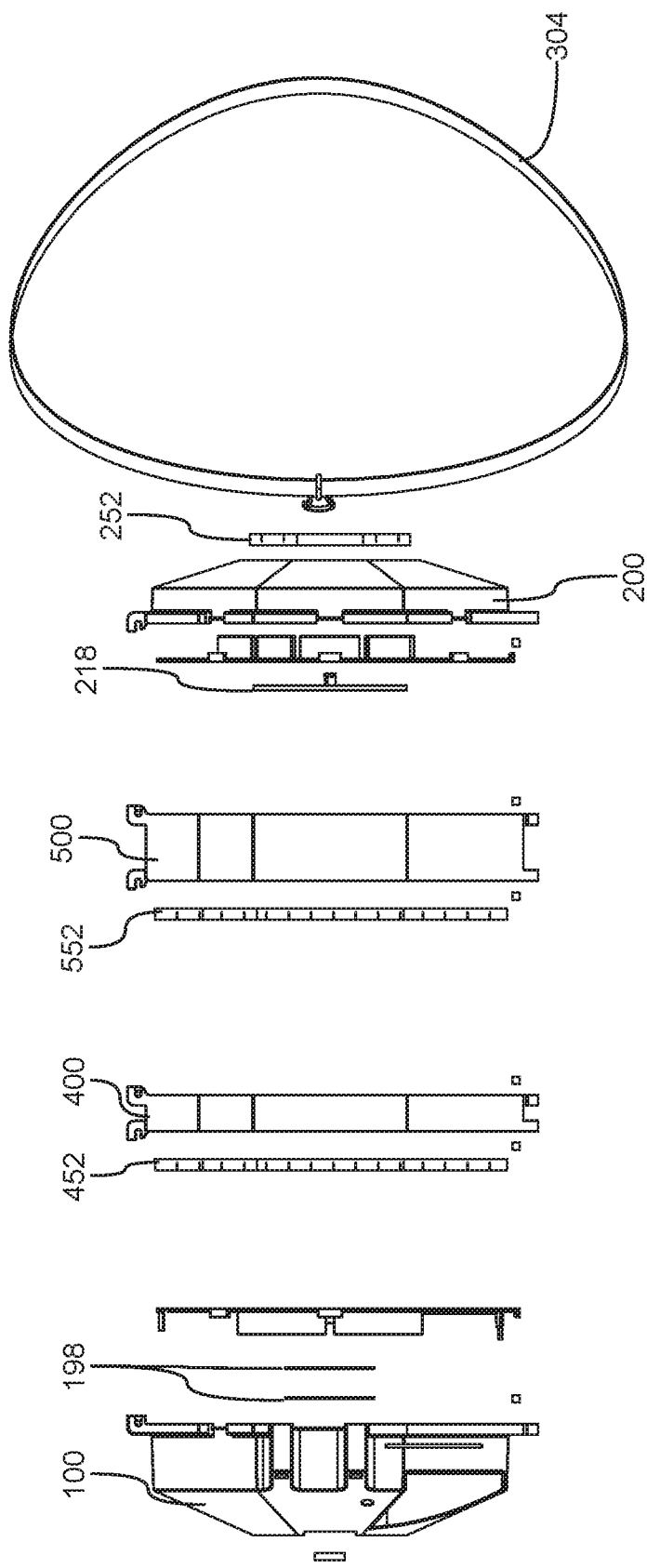

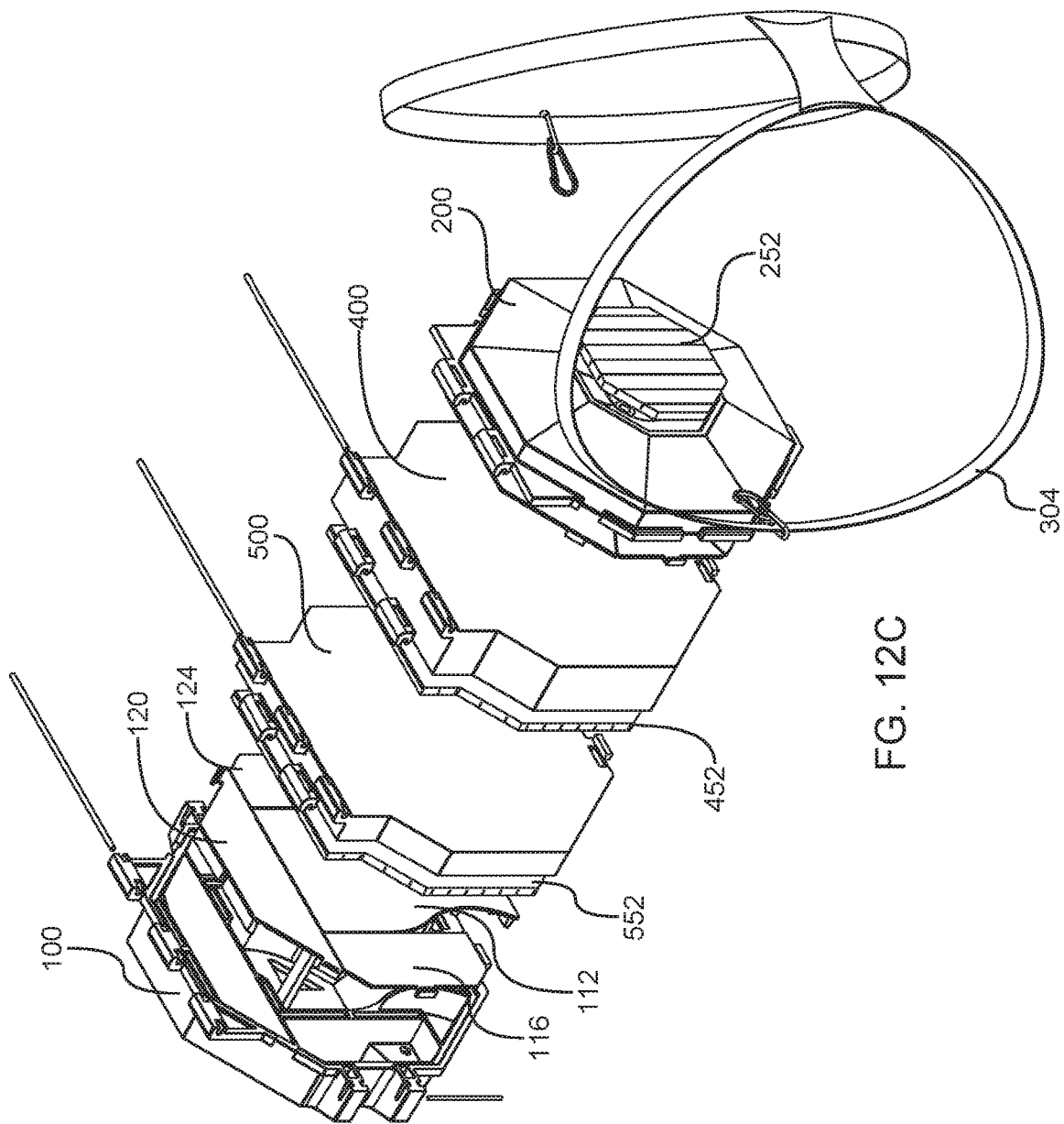

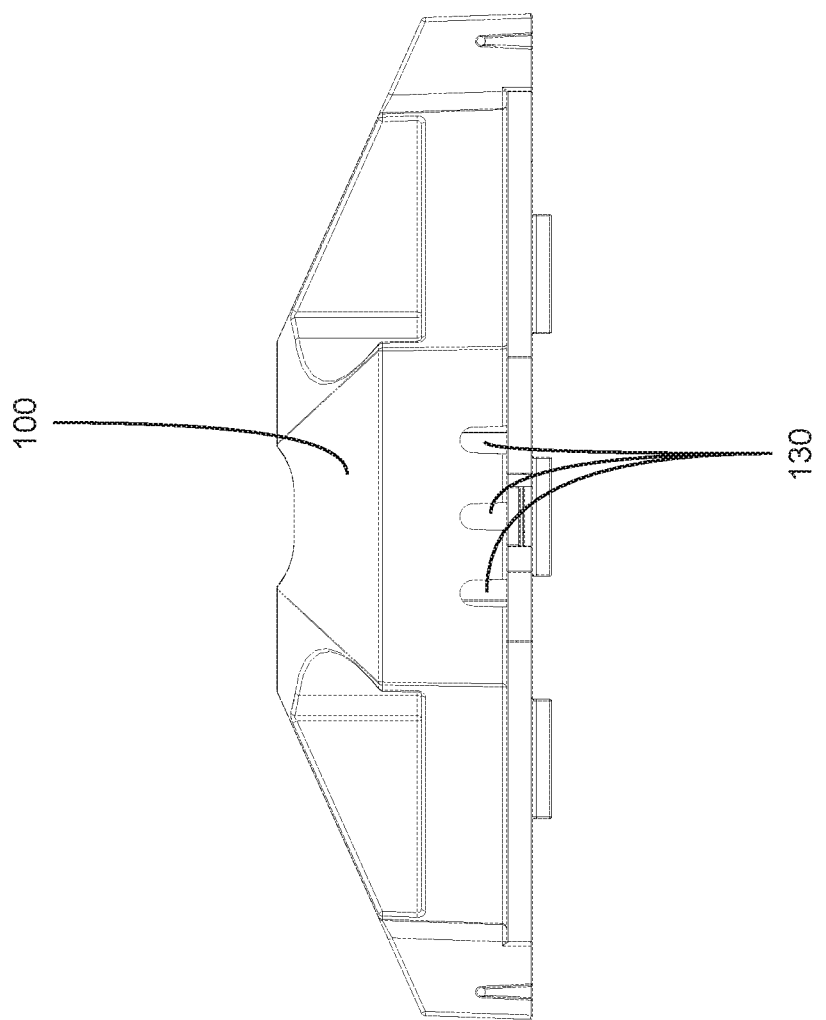

DETAIL B

EXPANDABLE PORTABLE TACKLE CONTAINER AND TIPPET DISPENSING METHOD AND DEVICE

PRIORITY CLAIMS

This patent application claims the benefit of provisional application No. 61/869,397 filed on the 23 Aug. 2013, and is herein incorporated by reference in its entirety.

COPYRIGHT STATEMENT

A portion of the disclosure of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The disclosure relates to methods and device for carrying fishing equipment and accessories and for dispensing tippet or leader from a tackle container. More specifically, the methods and device described herein relate to carrying fishing equipment and accessories in a portable and wearable container.

2. Description of the Prior Art

Fishermen typically carry, on their person, an assortment of various fishing flies, lures, leader, tippet, sinkers, and other fishing related accessories. Often these items are clipped to, carried on, placed inside a fisherman's vest or belt. For example spools of tippet have been designed to be clipped to a fisherman's vest, to allow the fisherman convenient access while fishing in or near a river or body of water.

As noted while fishing, it is common for a fisherman to frequently change or replace the fishing fly, lure, leader, sinker, or other accessory on his fishing line. Manipulation and/or attachment of the fishing fly and/or tackle generally requires the fisherman to perform complex dexterous tasks which can require close inspection of the work piece while performing such a task. As such, a system which can allow for the fisherman to tie fishing line about various accessories in a convenient manner, while not requiring the fisherman to return to shore or carry a large, or otherwise burdensome, tackle box would provide many advantages to the fisherman. For example, fly-fishermen generally carry several spools of leader "tippet" materials in different line diameters depending on the size of fish they are fishing for. Having to carry several spools creates undesirable issues. For example, if the spools are all located in a pocket, the angler has to search for the size he/she wants and may search for the right spool through various pockets which can require numerous attempts before locating the correct size. Other challenges also arise from currently employed tippet control systems, for example, elastic bands are often placed on or around the tippet spools, these elastic bands are used to keep the material from unspooling when not in use, however these elastic bands also often obscure the end of the tippet material which causes difficulty in locating the end when the fisherman desires to unspool a length of tippet. As such, finding the end requires removal of the band and searching for the end which is usually concealed among the remaining coils of material.

Applicant, therefore, has recognized that a need exists for a box or container which provides for easy and convenient access to various fishing supplies and accessories while the fisherman is fishing. The present application seeks to address and overcome many of these concerns.

SUMMARY OF THE INVENTION

The methods and device described herein provide a device which aids a fisherman in carrying and changing lures, fishing flies, fishing baits, tippet or leader lines, or various and numerous other possible fishing accessories. In some aspects, this device can especially assist fishermen who want to change the lure, fishing flies, or other fishing baits and accessories while standing midstream or in another place where a full tackle box would not be feasible or desirable.

One illustrative embodiment is a portable container, comprising: a first annular housing having an annular side wall being closed at an exterior end and open at an interior end, the annular housing being configured so as to define one or more hollow spaces therein, wherein at least one hollow space contains a tippet control system configured to receive a plurality of spools of tippet material; a second annular housing is also provided which has an annular side wall corresponding in shape to the annular sidewall of the first annular housing, the annular side wall being closed at an exterior end and open at an interior end. The second annular housing can be pivotably connected to the first annular housing via a modular hinge system. The second housing can be configured so as to define a plurality of hollow spaces therein, wherein a portion of the plurality of hollow spaces are arranged circumferentially about the annular side wall of the second annular housing. The first annular housing and the second annular housing can fold into a closed position wherein the closed position is defined by a configuration wherein the open interior end of the first annular housing and the open interior end of the second annular housing each face one another and substantially close to one another, and wherein the first annular housing and the second annular housing pivot away from one another to define an open position in order to expose their interior ends, thus providing access to the one or more hollow spaces contained therein.

In one embodiment, the tippet control system can further include at least one circular disk placed between each of the plurality of spools of tippet material. In yet another embodiment, the circular disks can be keyed so as to control the amount of tippet material that unspools when a force is applied.

In additional embodiments, the portable container can be expandable. More specifically, the container can further comprise additional expansion housings which can be removeably attached to either or both of the first and second annular housings. In such embodiments, wherein the container is provided with an expansion housing, the plurality of housings can pivotably open in a fan-like manner.

The portable container can further include a harness system, wherein the user can place one or both arms through the harness system and thereby carry the portable container on his/her person.

These and other embodiments are described in more detail herein.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an end view of the interior of a second annular housing forming part of the portable container of FIGS. 1A-D;

FIGS. 4A-B depicts an end view of the interior of a first annular housing forming part of the portable container of FIGS. 1A-D, as well as a keyed disc for separating tippet spools contained therein;

FIG. 8A-C illustrate various views of the portable container of FIGS. 1A-D in an open position, wherein a plurality of expansion housings are being employed;

FIG. 11A-D illustrate various views of the portable container of FIGS. 1A-D wherein the second annular housing and another additional expansion housing are opened and extended partially away in yet another open position;

FIG. 12A-C illustrate various expanded/exploded views of the portable container of FIGS. 1A-D.

FIG. 13 illustrates a side view of the first annular housing of the portable container of FIGS. 1A-D;

DETAILED DESCRIPTION OF THE PREFERRED EMBODIMENT

Figure 1A:
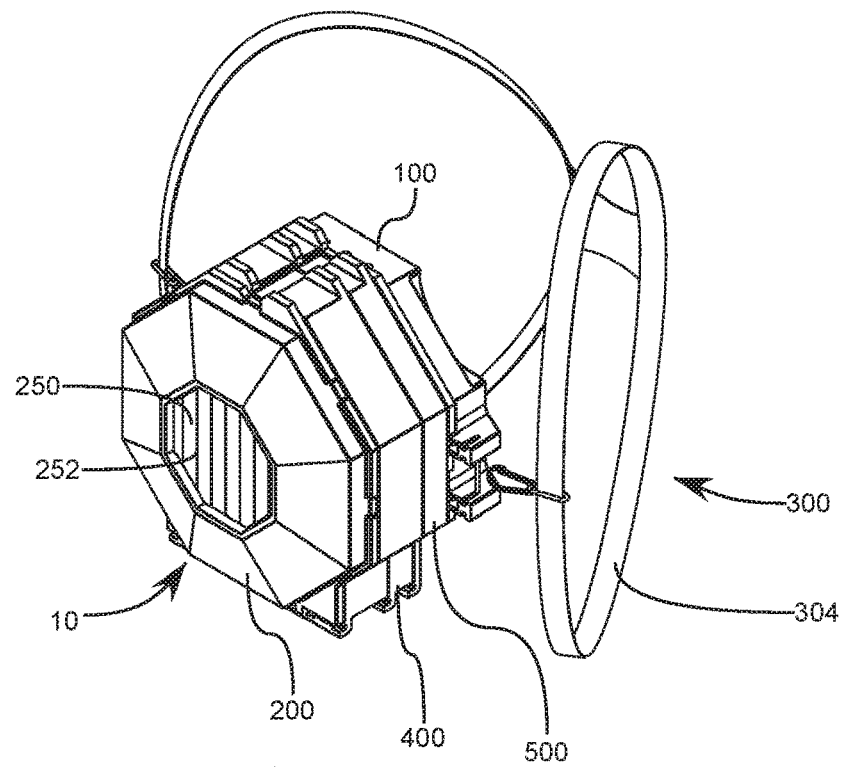
FIGS. 1A-D illustrate respective perspective, top, front and side views of a portable container and tippet dispensing device in accordance with one embodiment.
Figure 1B:
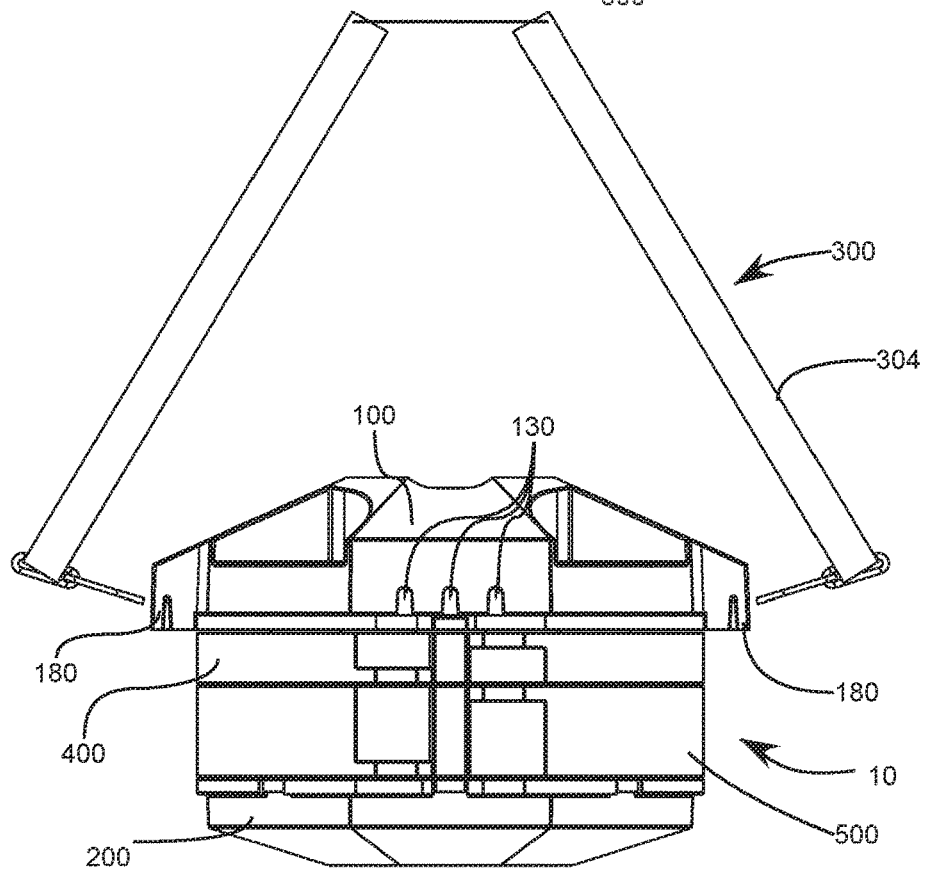
Figure 1C:
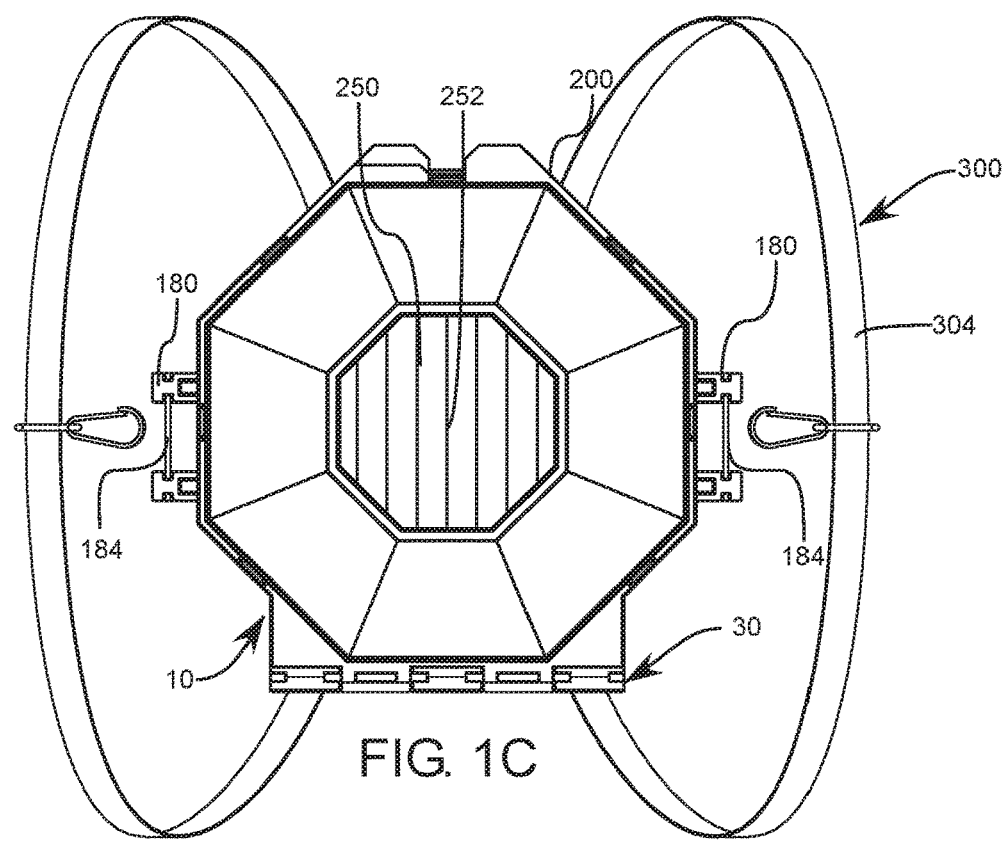
Figure 1D:
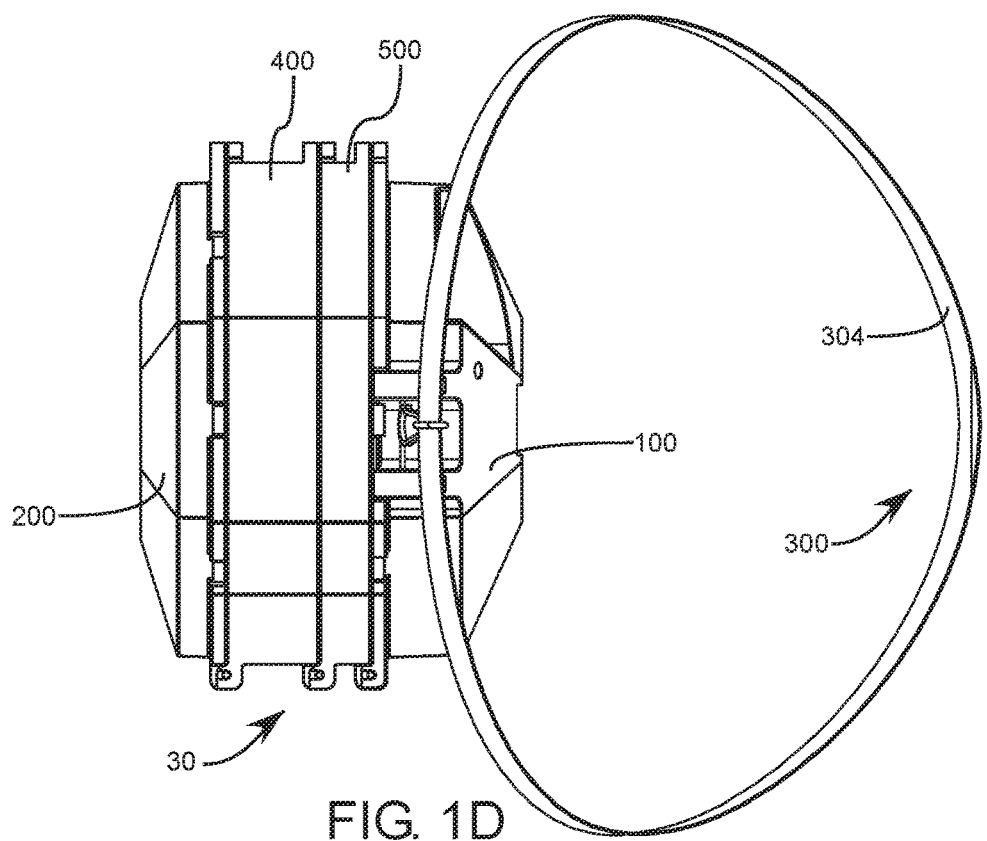
Figure 2:
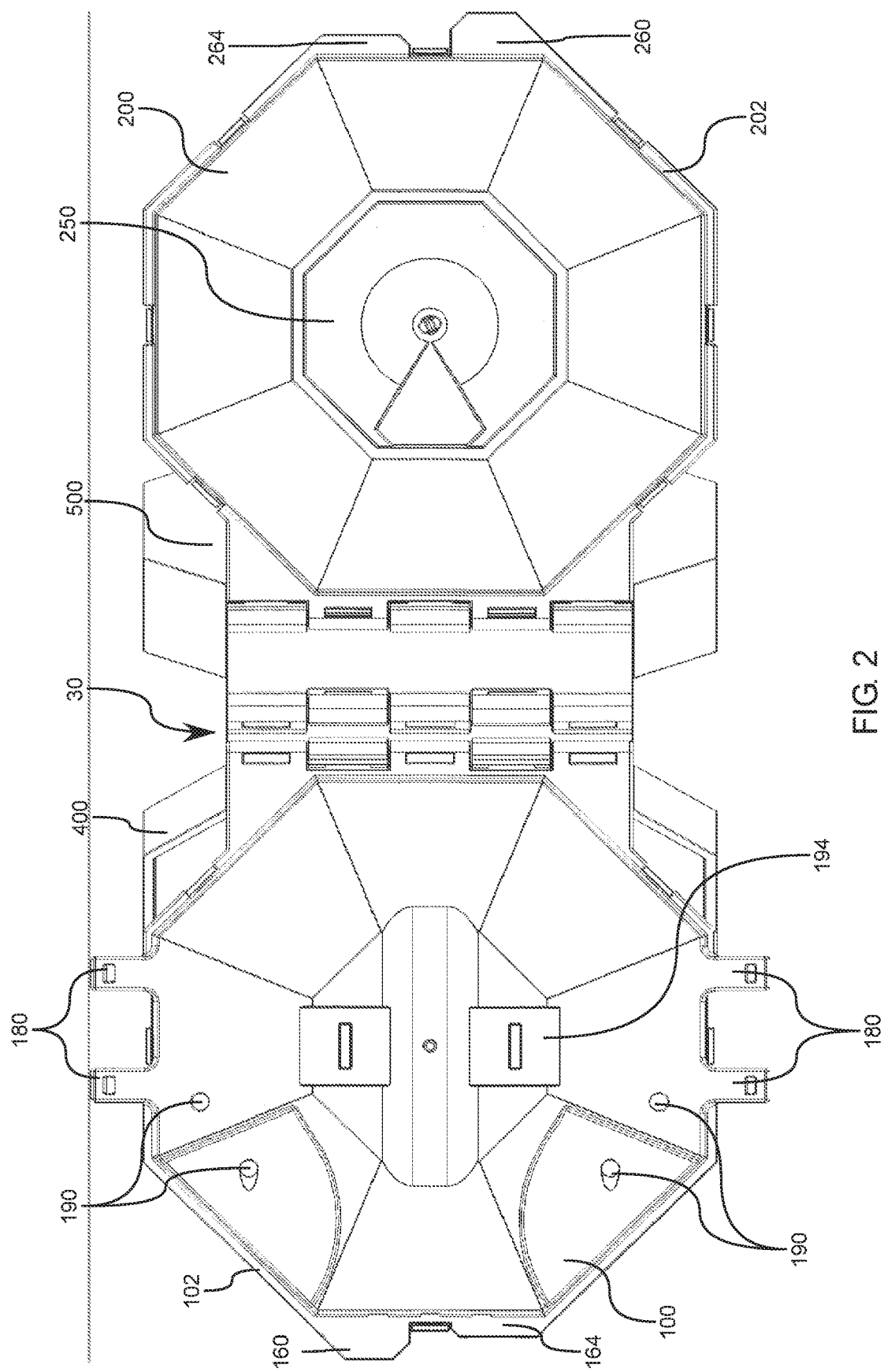
FIG. 2 illustrates a back view of the portable container of FIGS. 1A-D in an open position.
Figure 5:
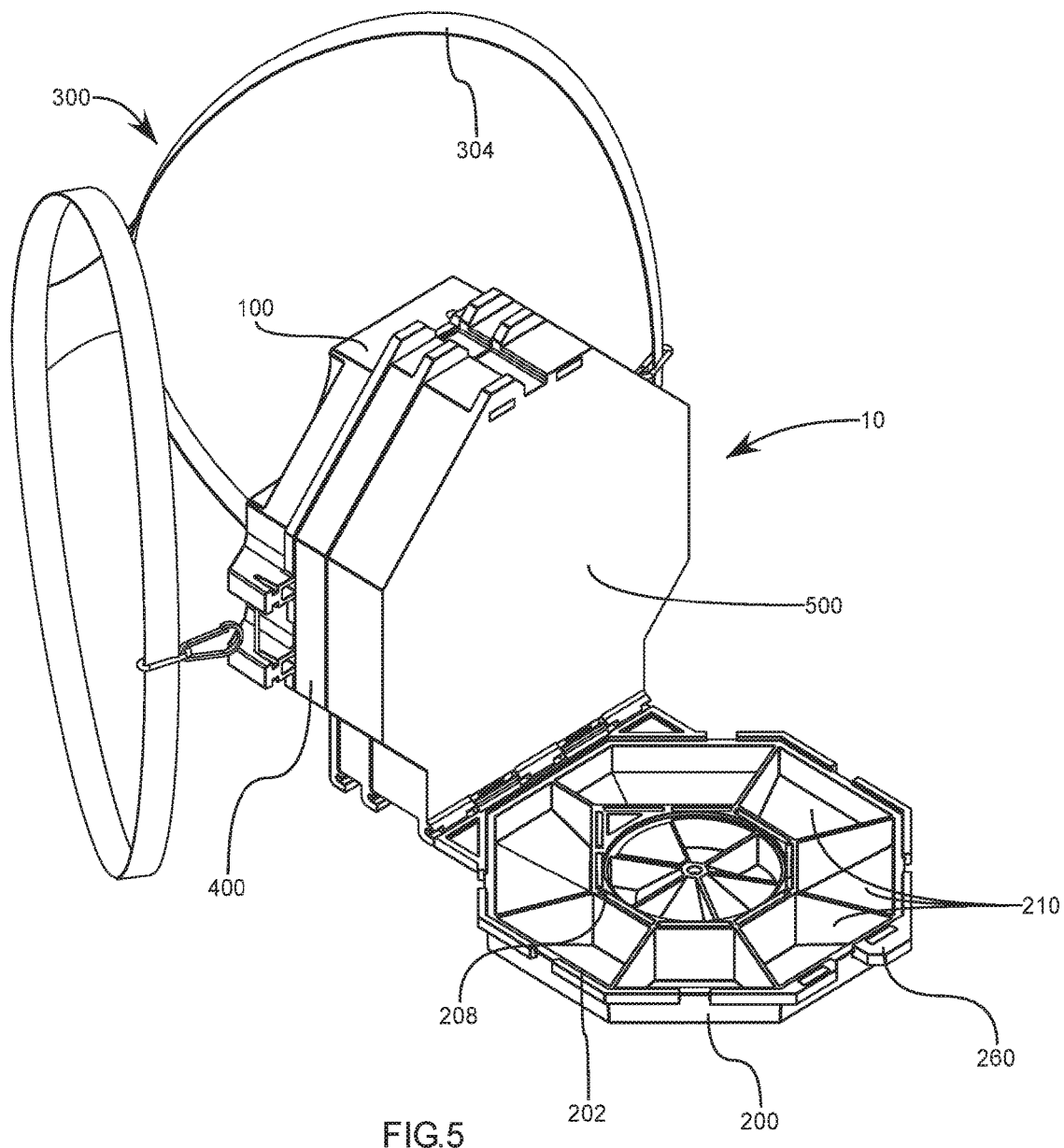
FIG. 5 depicts a perspective view of the portable container of FIGS. 1A-D, showing how the portable container can be opened to expose the interior of the second annular housing with a plurality of hollow spaces formed within the second annular housing being open to view.
Figure 6:
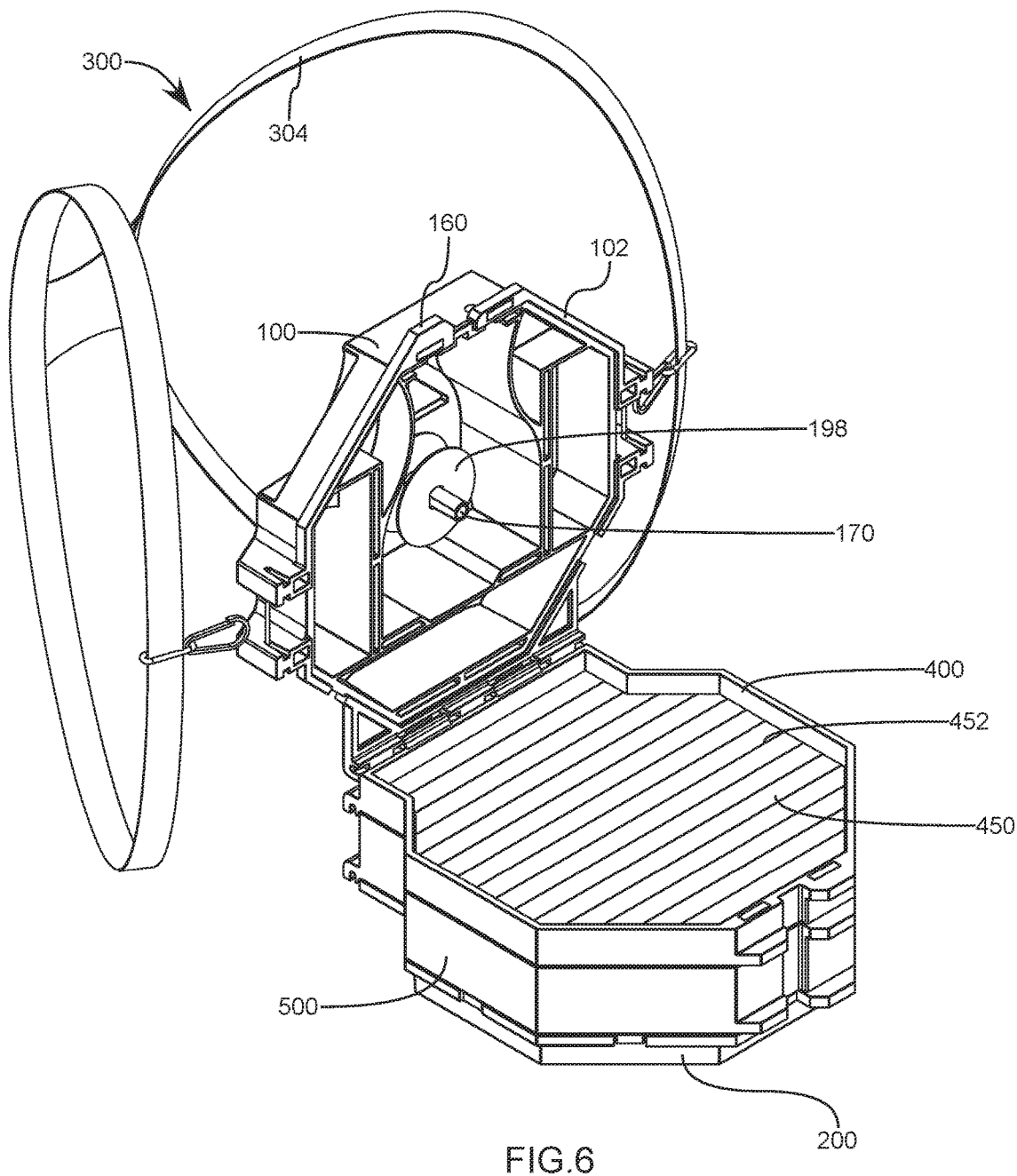
FIG. 6 depicts a perspective view of the portable container of FIGS. 1A-D, showing how the portable container can be opened to expose the interior of the first annular housing with a plurality of hollow spaces formed within the first annular housing being open to view.
Figure 7A:
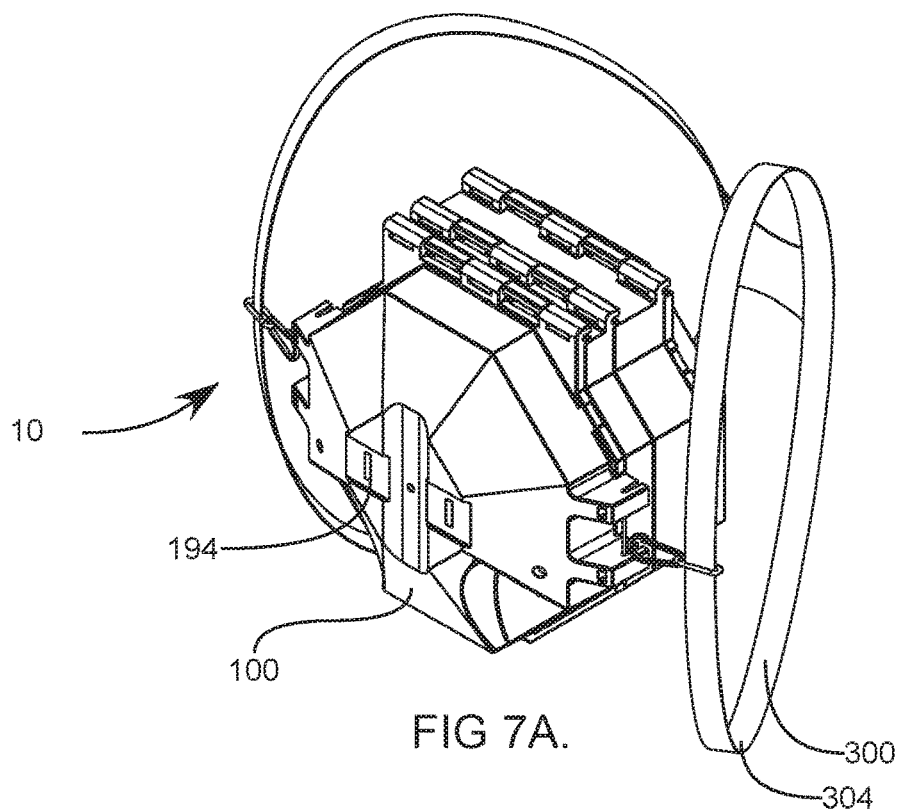
FIGS. 7A-D illustrate various views of the portable container of FIGS. 1A-D having a harness assembly intended to be worn by a user, the portable container being depicted in a closed position.
Figure 7B:
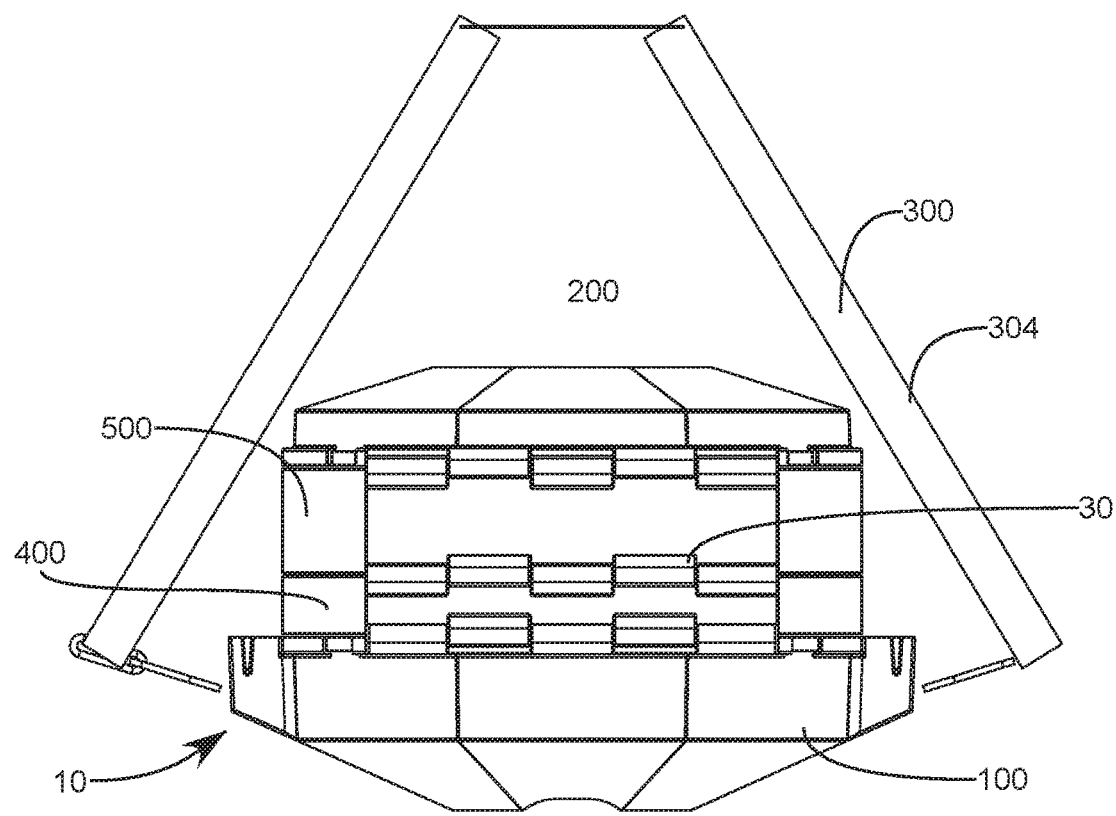
Figure 7C:
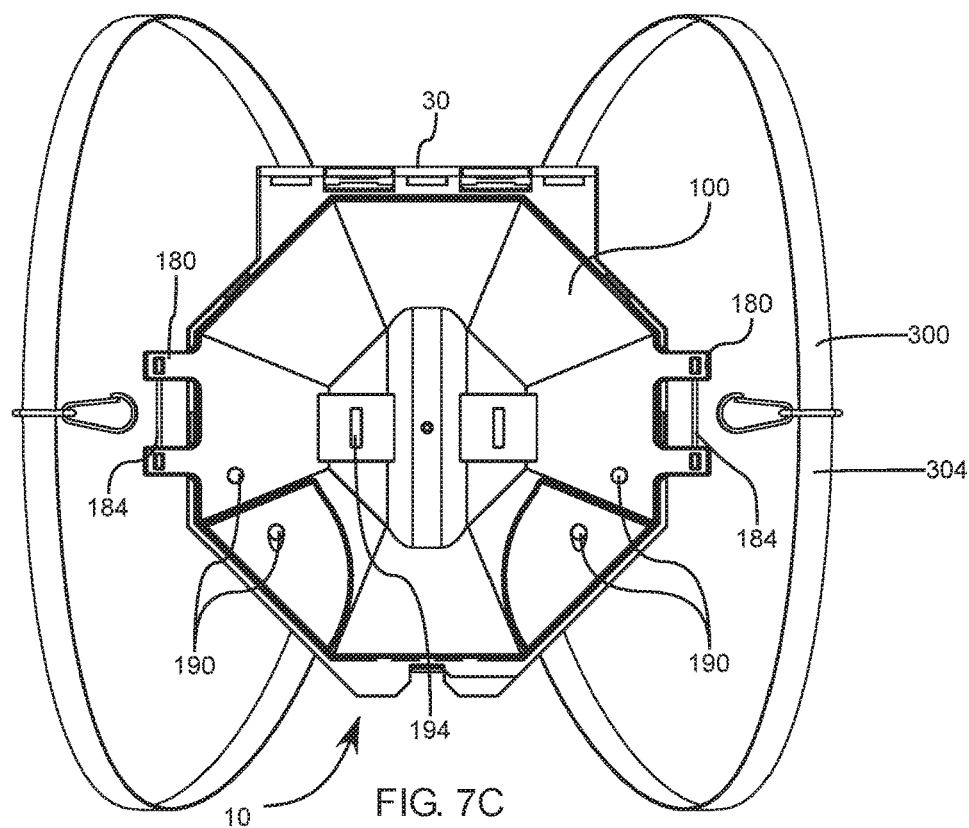
Figure 7D:
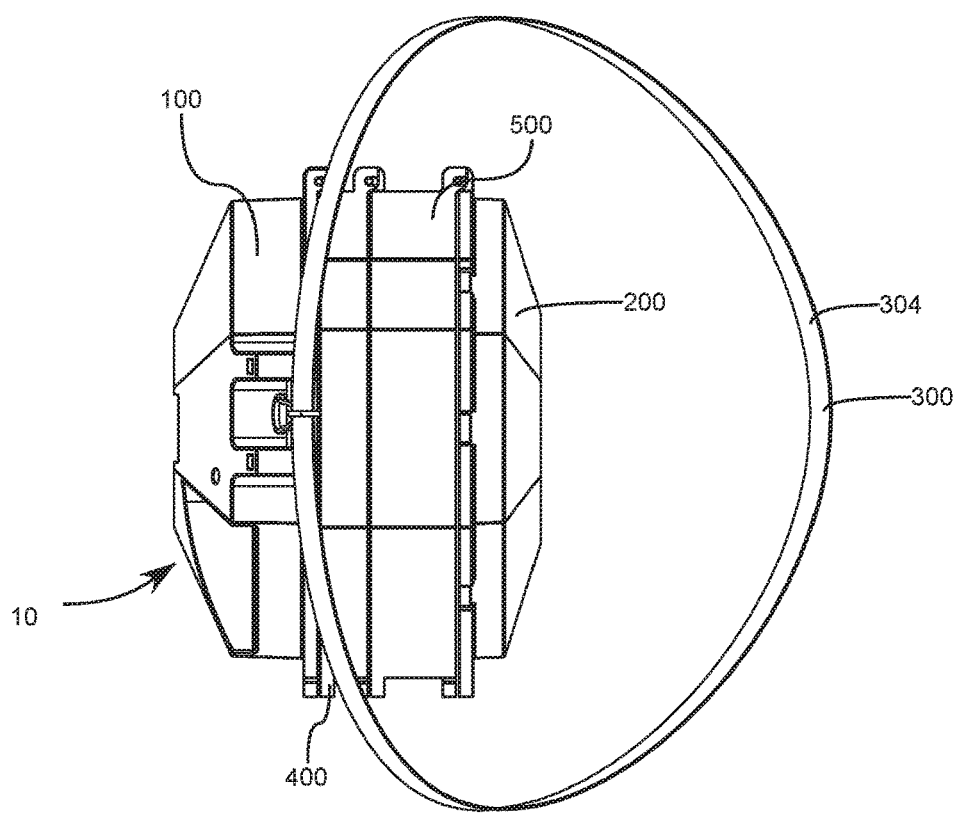

Fishing, or the activity of catching fish, is an ancient practice that dates back as many as 40,000 years. Over that period of time fishermen have implemented new technologies in order to more effectively and efficiently catch fish. Lures, fishing lines, fishing-flies, sinkers, attractants, and many other accessories have been developed to aide anglers in their fishing pursuits. Thus, fishermen typically carry an assortment of accessories to assist them in their efforts. Difficulty arises particularly in situations where a fisherman is fishing midstream and the need arises to change a fly, lure, sinker, or add a specified style of tippet, or other accessory. It would not be advantageous to require the fisherman to return to a large tackle box located on the shore or otherwise require the fisherman to move to a remote location to perform such a change. Thus fishermen often carry such accessories on their person by either placing such items in pockets or otherwise attaching such objects to their person. It has been recognized that a portable and convenient carrying container would be advantageous, particularly one that provides organized and convenient access to many different fishing accessories in a centralized location.

The present application seeks to provide an all-in-one device, whereby a fisherman can store accessories such as flies, lures, sinkers, floatants, attractants, and spools of tippet or leader wherein each of these, and more, items are easily accessible to a fisherman while said fisherman is in the act of fishing.

For purposes of this application, a detent can refer to any of a cavity, hole, channel, opening, slit, or other mechanism configured to temporarily keep a component in a certain position relative to that of another, and wherein the components can be released from each other by applying a force to one or both components. A hinge as described herein includes, but is not limited to, a jointed device or flexible piece on which one component pivots, turns, or swings away from a second component. Concave refers to any recess in a surface or any cavity to which can be provided an annular side wall, the annular side being substantially closed at one end, thus forming a hollow space of any size, shape or geometry, the hollow space being encircled by the annular sidewall. Further, an annular side wall of a concave area can be of any shape, be it geometric, or amorphous. Hereinafter any reference to annular includes any shape be it geometric or amorphous which has a substantially continuous outer wall that defines a hollow space encircled by such a wall. For further clarification shapes include, but are not limited, square, rectangular, hexagonal, octagonal, circular, polygonal and so forth.

In one embodiment, the portable container is described as a portable box having a first housing, which can be connected to a harness system and worn by the user. Connected to the first housing is a second housing, which can be pivotally connected to the first housing via a modular hinge system. The portable container can, for exemplary purposes, be supported about the chest of a user. In such an instance the second housing can be pivoted downward and away from the first housing, such that the interior of the second housing can be viewed by the fisherman. Further, the modular hinge system can be provided with a series of stops, the stops functioning to limit the distance the second housing can pivot away from the first housing, for example a maximum of 90 degrees, such that the second housing is orthogonal to the first housing. In this manner the rotation of the second housing can be limited such that the second housing would form a stationary shelf, the shelf extending away from the fisherman's chest, and assumedly parallel to the ground, such that the second housing can act as a work bench or a shelf onto which items can be placed without falling or wherein contents of various spaces provided within the second annular housing can be opened without fear of spilling the contents.

FIGS. 1-15 illustrate one embodiment of a portable container, shown generally at 10. The container 10 includes a first annular housing 100 and a second annular housing 200, wherein both the first and second annular housings, 100 and 200, are connected by a modular hinge system 30. The first annular housing 100 has a first modular hinge component 140 being part of the modular hinge system 30 located about a proximal edge 144 and a latch component 160 on a distal edge 164 opposing the proximal edge 144. Further, the second annular housing 200 has a first modular hinge component 240 being part of the modular hinge system 30 located about a proximal edge 244, and a latch component 260 on a distal edge 264 opposing the proximal edge 244.

Each of the annular housings 100 and 200 include an annular side wall 102, and 202 respectively. The annular side walls are each closed and a first exterior end 104, and 204 respectively, and open at a second interior end 106, and 206 respectively. In this manner each of the first and second annular housings 100 and 200, define a hollow concave space defined therein, 108 and 208 respectively. The closed first exterior end of each respective annular housing, 104, and 204 respectively, can be provided as a flat surface, a domed surface, a faceted surface, an amorphous shape, or any other shape suitable to close their respective exterior end, each closure being capable of being provided in any combination of such shapes. It will be further appreciated that the closed end of the first exterior end 104 of the annular housing 100 can be ergonomically shaped so as to better and comfortably conform to the chest of an intended user. The hollow concave spaces, 108, and 208, can be further divided and segregated to provide a plurality of individual and distinct hollow spaces or compartments.

Figure 8A:
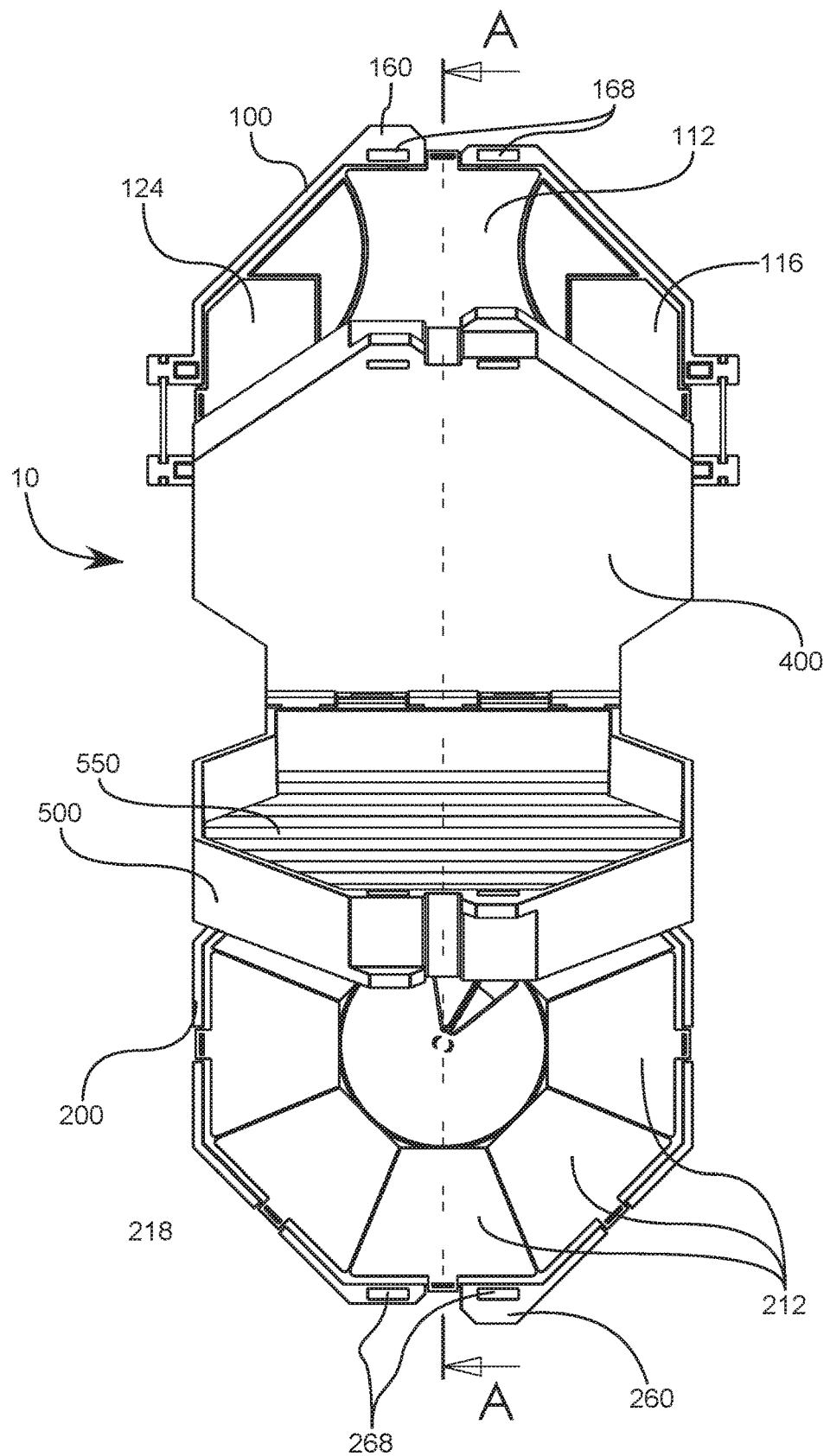
Figure 8C:
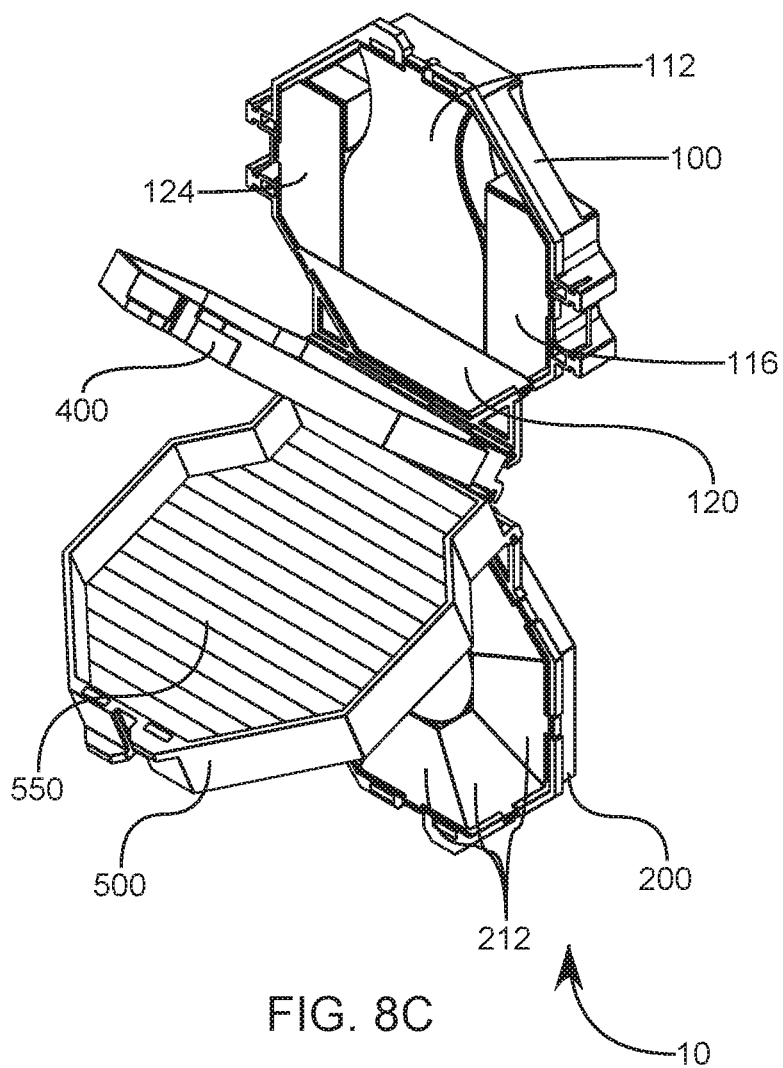
Figure 9A:
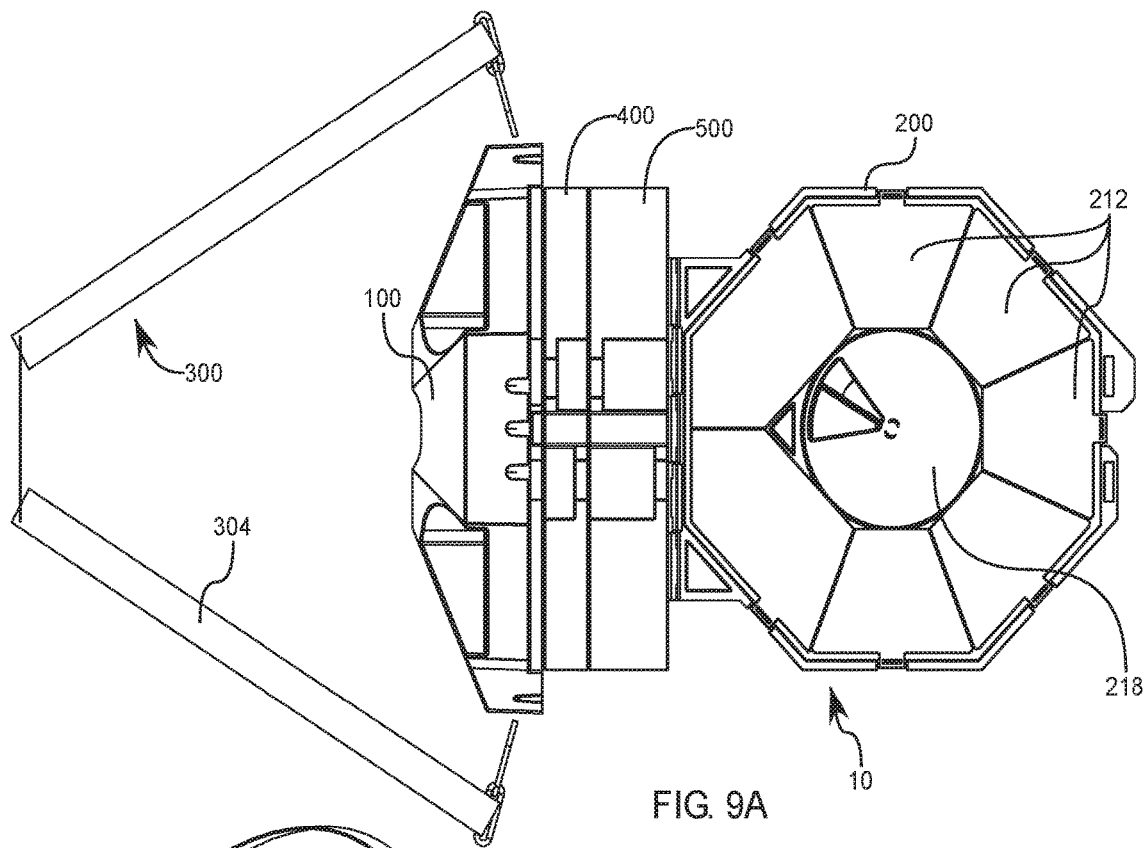
FIG. 9A-D illustrate various views of the portable container of FIGS. 1A-D wherein the second annular housing is opened and extended partially away in an open position.
Figure 9B:
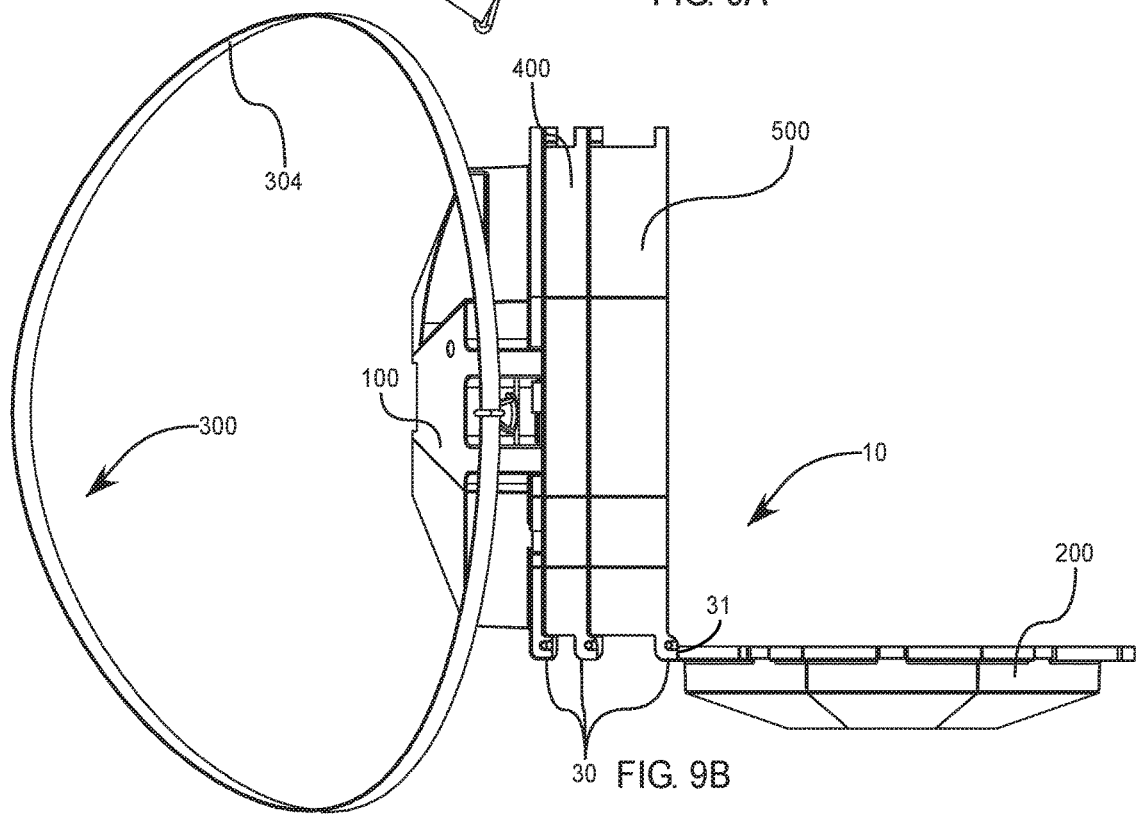
Figure 9C:
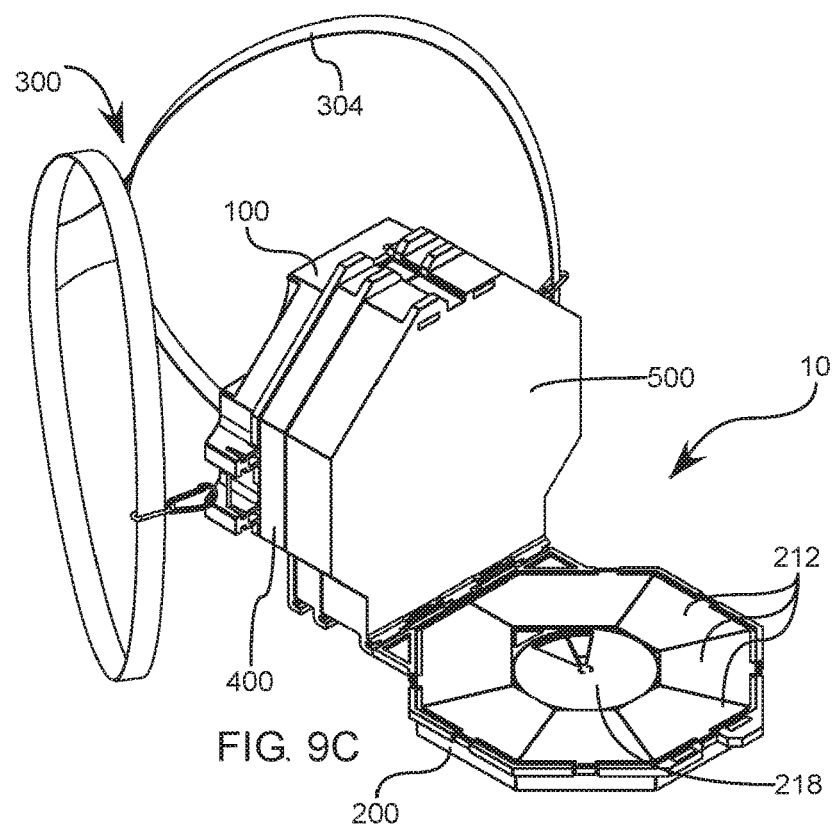
Figure 9D:
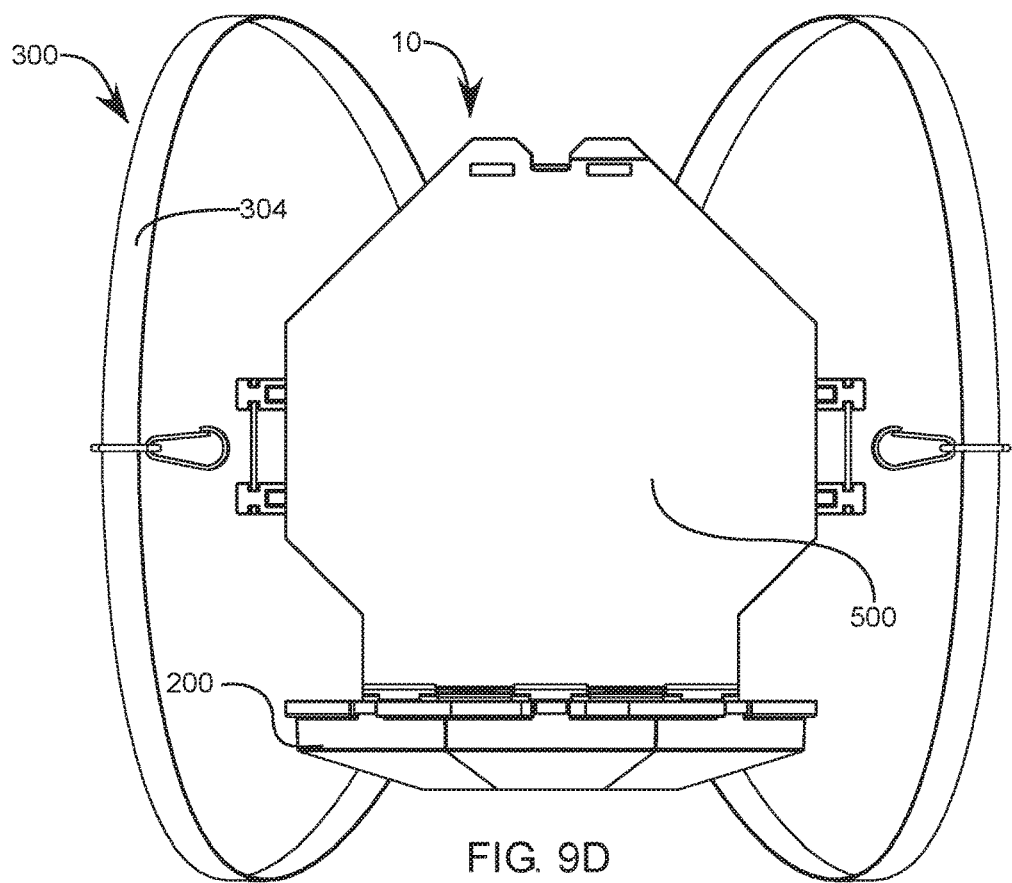
Figure 10A:
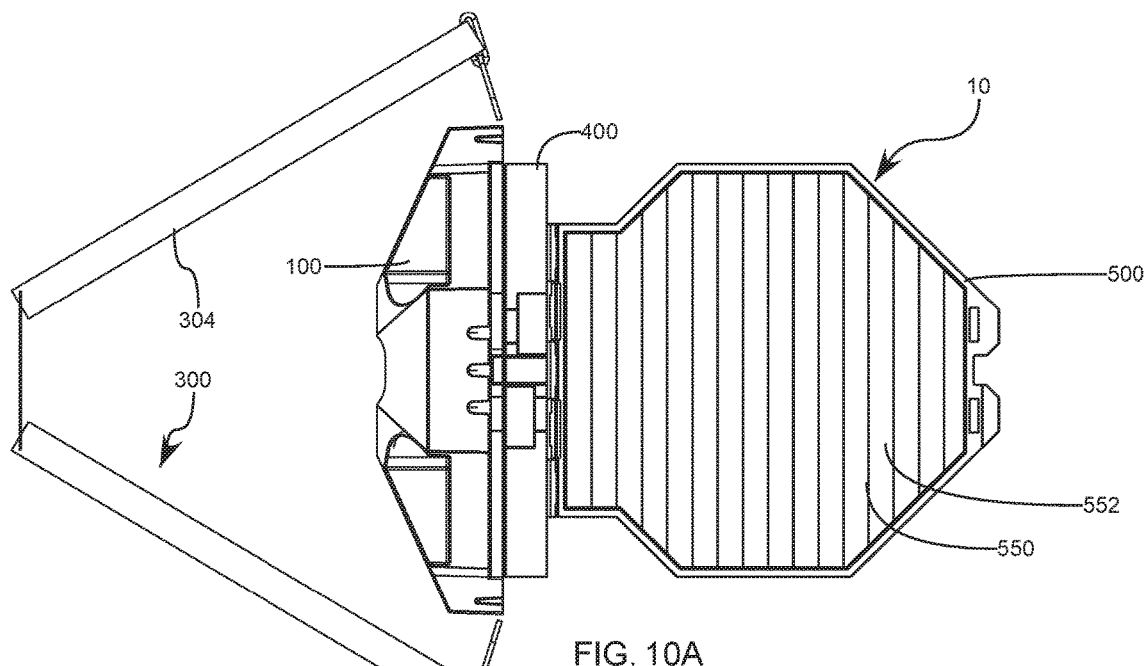
FIG. 10A-D illustrate various views of the portable container of FIGS. 1A-D wherein the second annular housing and one of the expansion housings are opened and extended partially away in another open position.
Figure 10B:
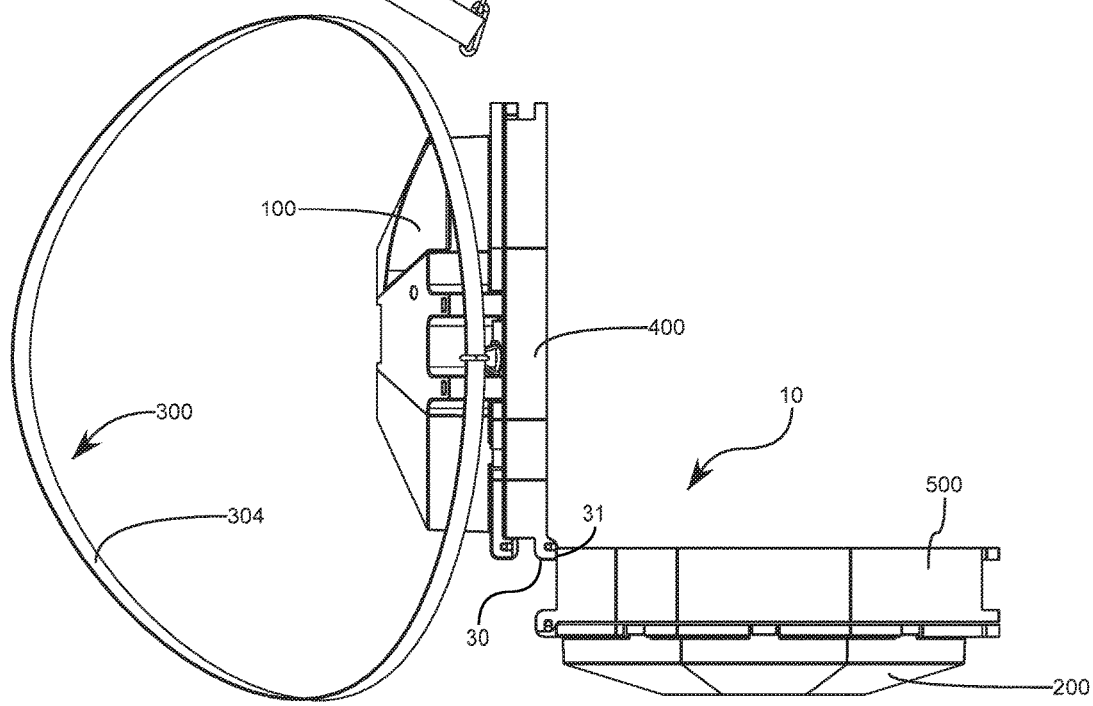
Figure 10C:
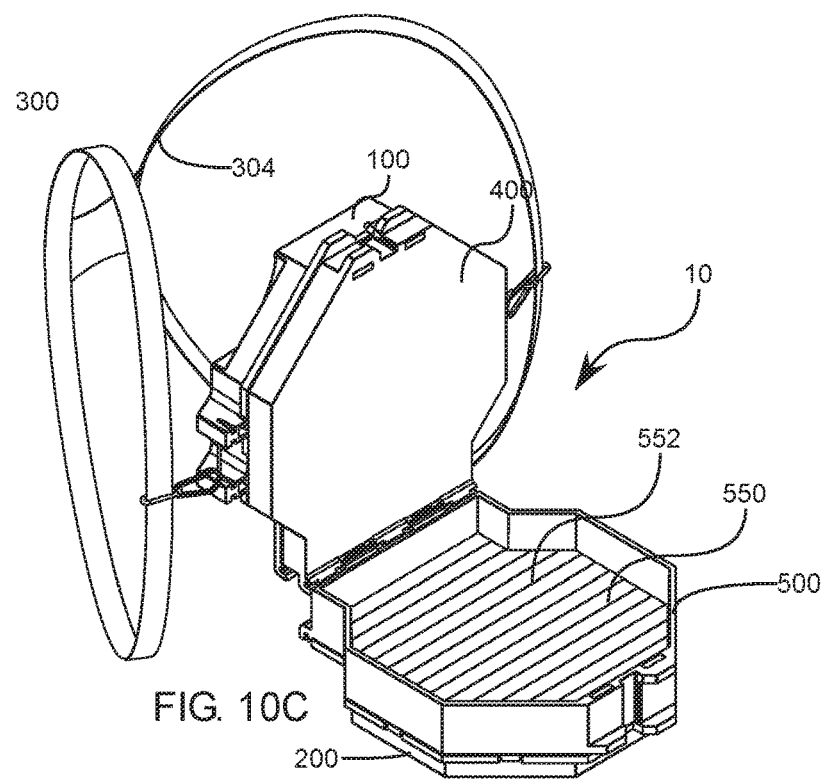
Figure 10D:
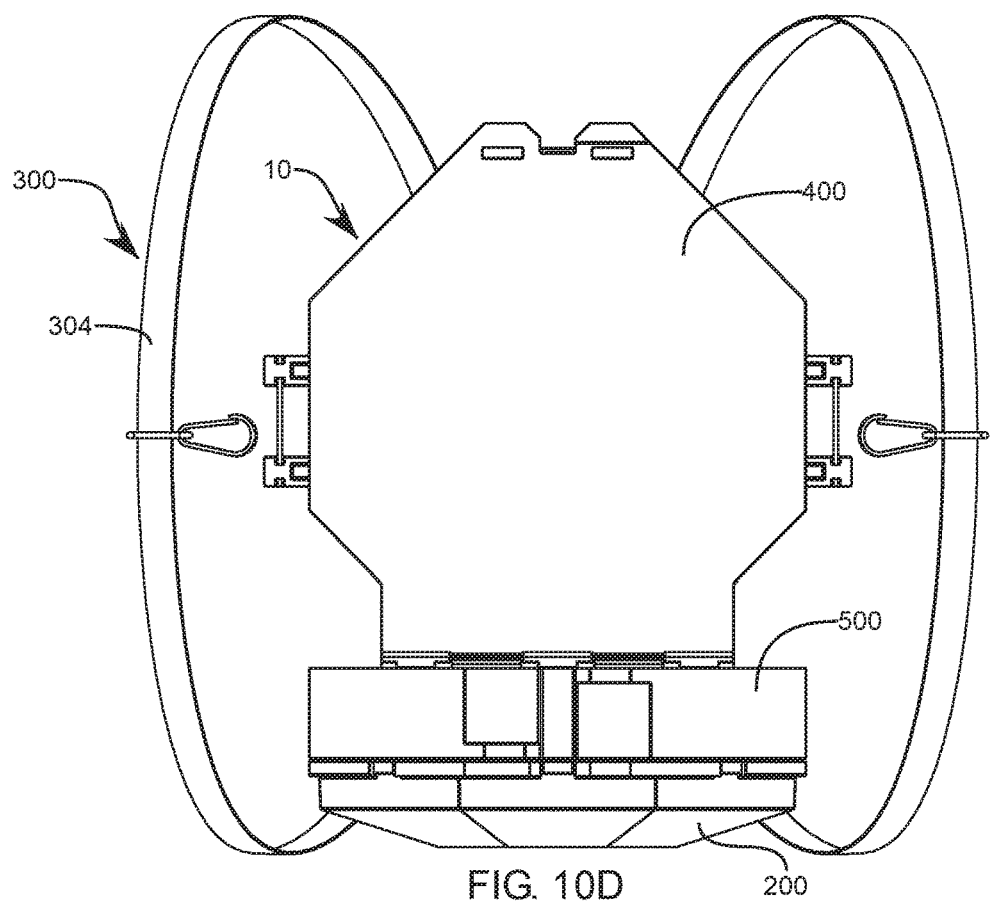
Figure 11A:
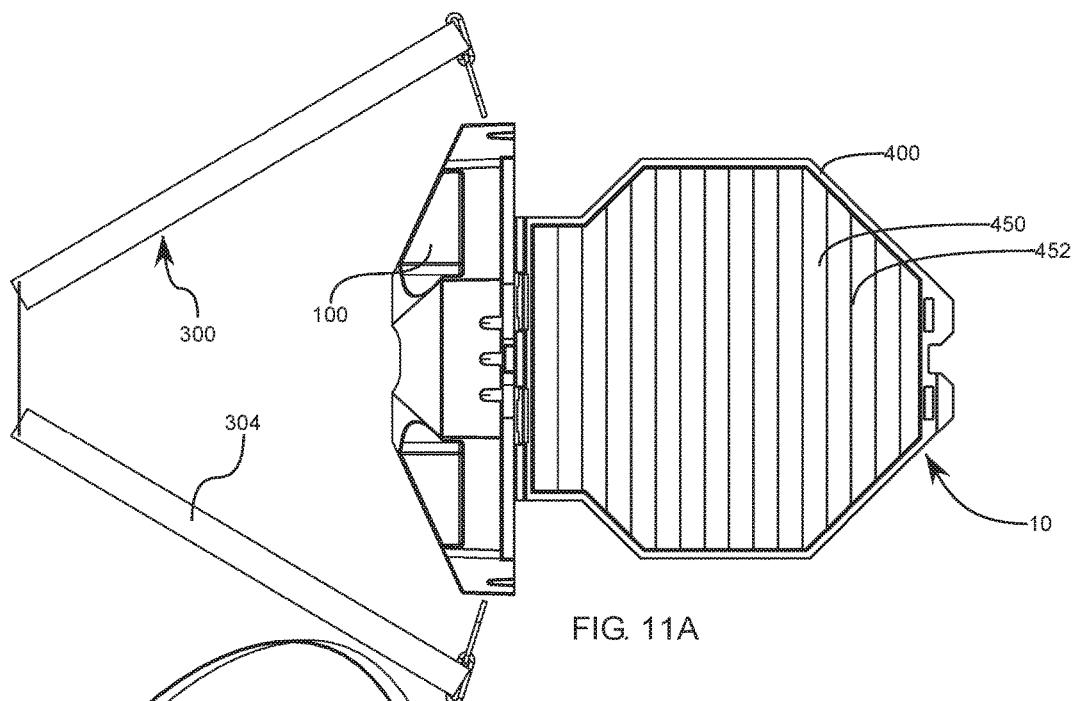
Figure 11B:
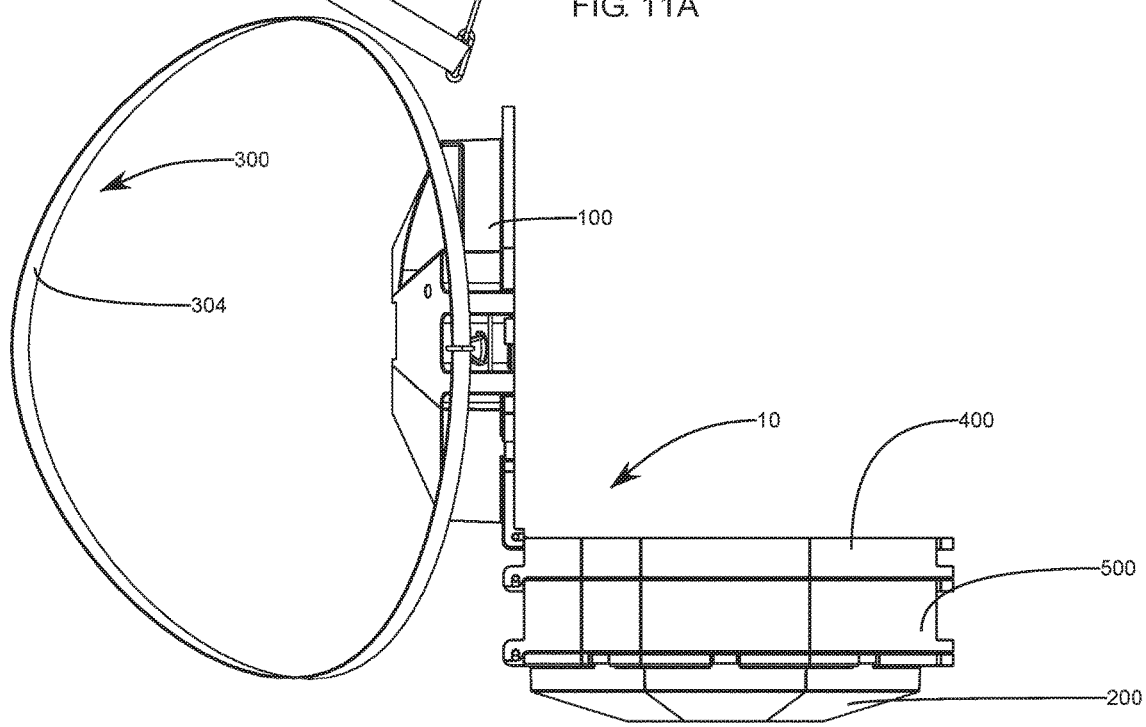

The modular hinge system 30 can them be used to selectively rotate the first and second annular housings toward one another such that their respective open interior ends 106 and 206 respectively can pivot towards one another and effectively close against one another so as to enter a closed configuration as shown in FIGS. 1A-D. Additionally, the modular hinge system 30 can be utilized to pivot the first and second annular housings away from one another so as to enter an open configuration as shown in FIGS. 8A-C. It will also be appreciated that the modular hinge system 30 can have hinge components located about the various annular housings such that the annular housings can be separated and reattached one to another. Additionally the modular hinge system can be provided with a series of stops 31 or other flat surfaces which abut against the annular side walls of the annular housings in the open position in such a manner that the outward rotation of the annular housings with respect to one another can be limited. In the present embodiment the stops can limit the rotation to a maximum of about 90 degrees. This limited rotation can then be utilized to allow the open annular housing to stop at a perpendicular position from the user and thereby act as a shelf such that the top of the open annular housing can then be used as a work shelf/bench. An additional benefit of this configuration, is that the contents of the hollow spaces of the open annular housing can then be accessed without fear of spilling the contents.

The portable container 110 can further include a support system 300 configured to support the portable container about a fisherman's person. While the support system 300 is shown and discussed herein as a harness 304, the support system can also be provided as a lanyard, strap, or other suitable device which can be placed over the shoulders, around the waist, around the neck, or in any other suitable manner in order to support the portable container about the body of the fisherman. In some embodiments, the support system 300 can further include clips for attaching and securing the container to the fisherman's person, outer garments, a pack, or other fishing gear.

In order to provide a stable and robust method of supporting the portable container 10 about the support system 300, the first annular housing can be provided with a plurality of tabs 180, the tabs 180 having a substantially rigid material 184 spanning the distance between the tab. The substantially rigid material 184 is shown herein as a replaceable metallic bar, however any substantially rigid material can be used so as to form a slot between the substantially rigid material and the annular sidewall 102. Such substantially rigid material can also alternatively be unitarily formed of the same substance as the tabs 180 and the annular sidewall 102.

As shown, in at least one embodiment, the first and second annular housings 100 and 200 are provided with a three-dimensional octagonal shape. It is also contemplated herein that the annular housings can have a conical, circular, rectangular, or any other geometrical shape. Additionally, while the container shown in each of the FIGS. 1-15 has contours, a container having substantially flat or contiguous sides is also consistent with the present disclosure.

In some embodiments, and as shown in FIGS. 4, 11C, and 11D, the second annular housing 200 can further be shaped so as to define a plurality of hollow spaces 110, 114, 118, and 122 contained therein. The plurality of hollow spaces can be configured to hold various fishing accessories. In particular the hollow space 110 can be configured to receive a plurality of spools of tippet material.

In the present embodiment the first annular housing 100 can further define one or more apertures 130 which can provide access to hollow space 110. Additionally, the exterior surface of first component 100 can be shaped to accept a variety of accessories, including: pliers (not shown) which can be bent on both sides to fit the contours of the first annular housing 100. It will also be appreciated that nippers and other accessories can be attached to an exterior surface of the annular housings via an attachment interface 194. One method of attaching such accessories to the exterior surface of the portable carrying case 10 includes the provision of holes 190 or passages which allow access to the various the hollow spaces defined by the annular housings. Then retractable cord/lanyard mechanisms (not shown) can be provided in the hollow spaces and the retractable cord extended through the holes or passages such that when released, the accessories are pulled against the exterior surface of the portable carrying case. Another example of such an accessory is given by providing a rubber O-ring to the end of such a retractable cord, in this manner the O-ring could be stretched to go around the neck of a small bottle, for example, a floatant, in this way the floatant can be retracted after use without having to worry about dropping the bottle into the stream after use. Additionally the retractable cords could go through the thumb loops of a pair of pliers, scissors, or nippers, thereby eliminating the fear of dropping such accessories. Further, the annular housings can further include magnets to hold accessories in place and to prevent the accessories from creating unwanted noise.

In the embodiment shown in FIGS. 1-15, there is provided a recess 250 in the second annular housing 200, wherein the recess 250 is provided with a porous insert 252. The porous insert can be provided as a cork, foam, fabric, or other material through which a fishing hood can be hooked and securely held. By providing this porous material 252, flies and other accessories can be securely fastened to the outer surface of the portable container in an easy to access and easy to see manner so that such accessories can be readily retrieved by the fisherman.

In the embodiment shown in FIGS. 1-15 the first and second annular housings 100 and 200 are provided with respective latch components 160 and 260 respectively, as discussed above. The latch component 260 can be provided with a series of magnets 168 which are attracted to a series of magnets, ferromagnetic bars or plates 268 located about the latch component 260. The use of ferromagnetic bars or plates 268 rather than magnets in latch component 260 can be advantageous in the event that ferromagnetic hooks or other ferromagnetic accessories are kept in the hollow spaces located near the latch as such magnets can unwantedly pull such components out of the hollow spaces upon opening.

It will be appreciated that lids covering the plurality of hollow spaces 210 and 110, 104, and 108 in each of their respective annular housings are not mandatory, but can prove to be advantageous, particularly as the compartments can contain numerous small items which can mix and become tangled when closed, or can fall out upon opening of the portable carrying case 10. Therefore while FIGS. 3-6 are shown with the annular housings with the lids removed for illustrative purposes, that FIGS. 8-11 show a variety of lids 112, 116, 120, 124, and 212 being provided over their respective hollow spaces so as to enhance the capacity of the portable carrying case to organize the contents. Such lids can be provided with latching mechanisms located about the outer perimeter of each respective lid latching to a corresponding latch component located about the outer perimeter of its respective annular housing. A further central hollow space 214 having a plurality of wedge shaped compartments can be provided and a circular lid 218 can be provided over the central hollow space the circular lid being rotatable about the central axis and having a slot provided therein to selectively choose which compartment to provide access to one of the compartments.

Each of the plurality of compartments 210 can be separated by a compartment wall 290, thus dividing the central hollow space into the plurality of wedge shaped compartments. These compartment walls can be unitarily formed with the annular housing in which it resides, or alternatively the compartment walls can be removable and provided as a snap fit such that the individual size of each compartment can be individually customized in shape and size.

It will be appreciated that the closeable lids provided over the hollow spaces can include a series of individually closeable lids being individually closed via an individual latch and detent for each cavity. Alternatively a single lid which covers all the cavities which can be pivotably connected to the first component at hinge 30, wherein the single lid is secured with a detent. In some embodiments, a detent can be formed on each lid, while in other embodiments the detent can be formed on an outer wall of the cavity to which the lid closes. In yet additional embodiments, the detent can be on both the lid and the second component thus forming a double latch.

As shown, the first annular housing 100 further defines a plurality of hollow spaces 110, 114, 118, and 122, each having and defining a hollow space wherein hollow space 110 is a tippet control space. The tippet control space 110 can be provided with an axle or post 170 secured to a central portion of hollow space 110. As discussed above, the other hollow spaces can be provided with one or more retractable cords (not shown). Additionally, as discussed above, the hollow spaces can be provided with closeable lids so as to facilitate holding or containing one or more lures, fishing-flies, strike indicators, or other fishing accessories.

Figure 15B:
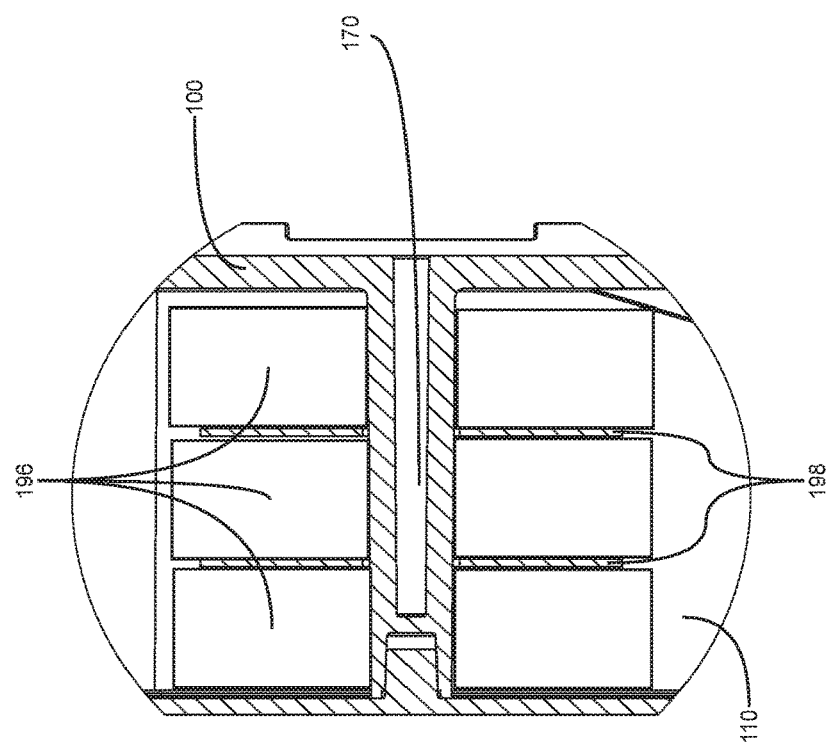
FIG. 15A-B illustrate sectional side views of the portable container of FIGS. 1A-D, and shows a detailed sectional view of a tippet control system.
Figure 15A:
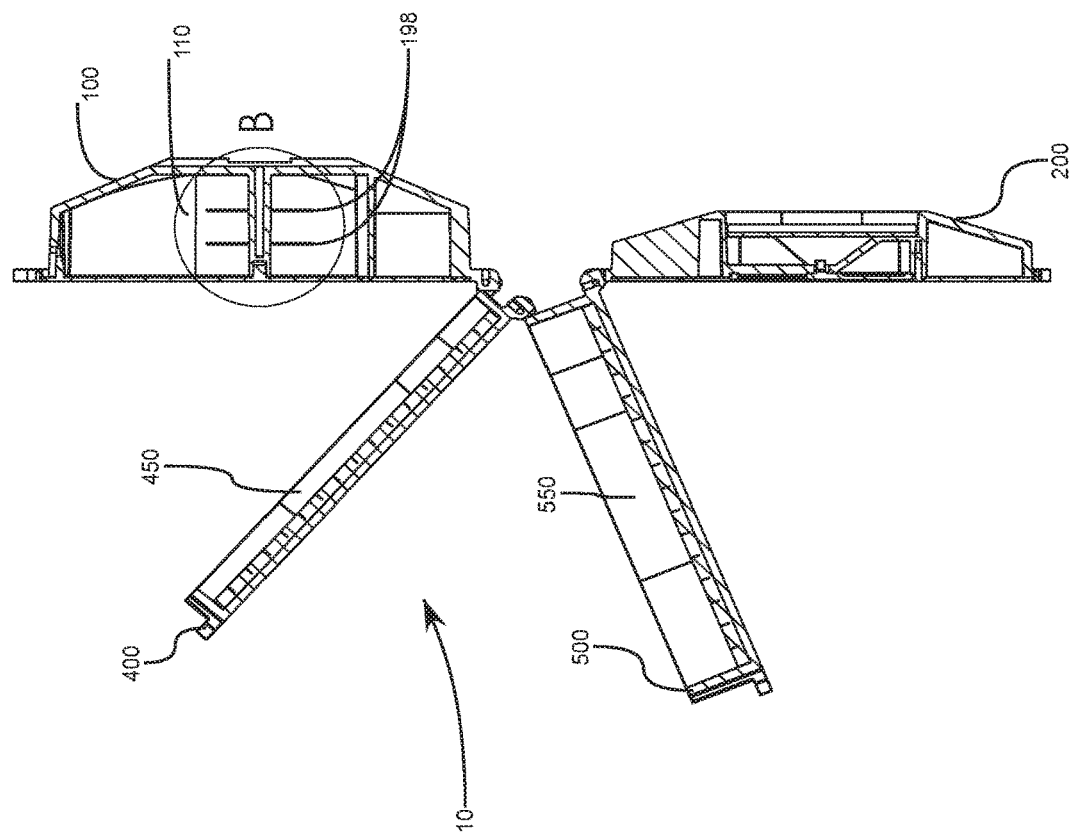

As shown in FIGS. 15A-B, in order to prevent the unwinding of one spool of tippet material from imparting rotation to and unwinding an adjacent spool of material, a plurality of tippet separation disks 198 can be provided between each of the spools of tippet material 196. The separation disks 198 can be keyed along with the axle 170 such that the spools of tippet are allowed to spin relatively freely, meanwhile the tippet separation disks are prevented from spinning by a key. The keys of the present embodiment can include flat sides on the axle 170 with corresponding flat edges on the keyed separation disks 198, as seen in FIG. 4. The keyed separation disks 198 slide over the axle 170 in between each spool of tippet material and operate to prevent rotation from one spool of tippet material from imparting rotation to an adjacent spool of tippet material. The rotation between spools being limited because no spool actually touches an adjacent spool, but only abut against the separation discs, which discs cannot rotate because the flat edges, or keys, abut the flat edges or keys of the axle 170 such that rotation is not allowed.

In some embodiments the tippet control space 110 can include one or more spools 196 of tippet or leader that extend from the tippet control space 110 and out of apertures 130. In some embodiments, a rubber strap (not shown) can be secured to component 200 in such a manner as to hold the tippet or leader 190 in place. It is also contemplated herein, that more than one rubber strap can be used, in combination, to hold the tippet or leader in place and thereby only allow the tippet to move in one direction. In additional embodiments, the apertures can be notched in a manner so the tippet can only pull out and will not retract back towards the spool.

Figure 14:
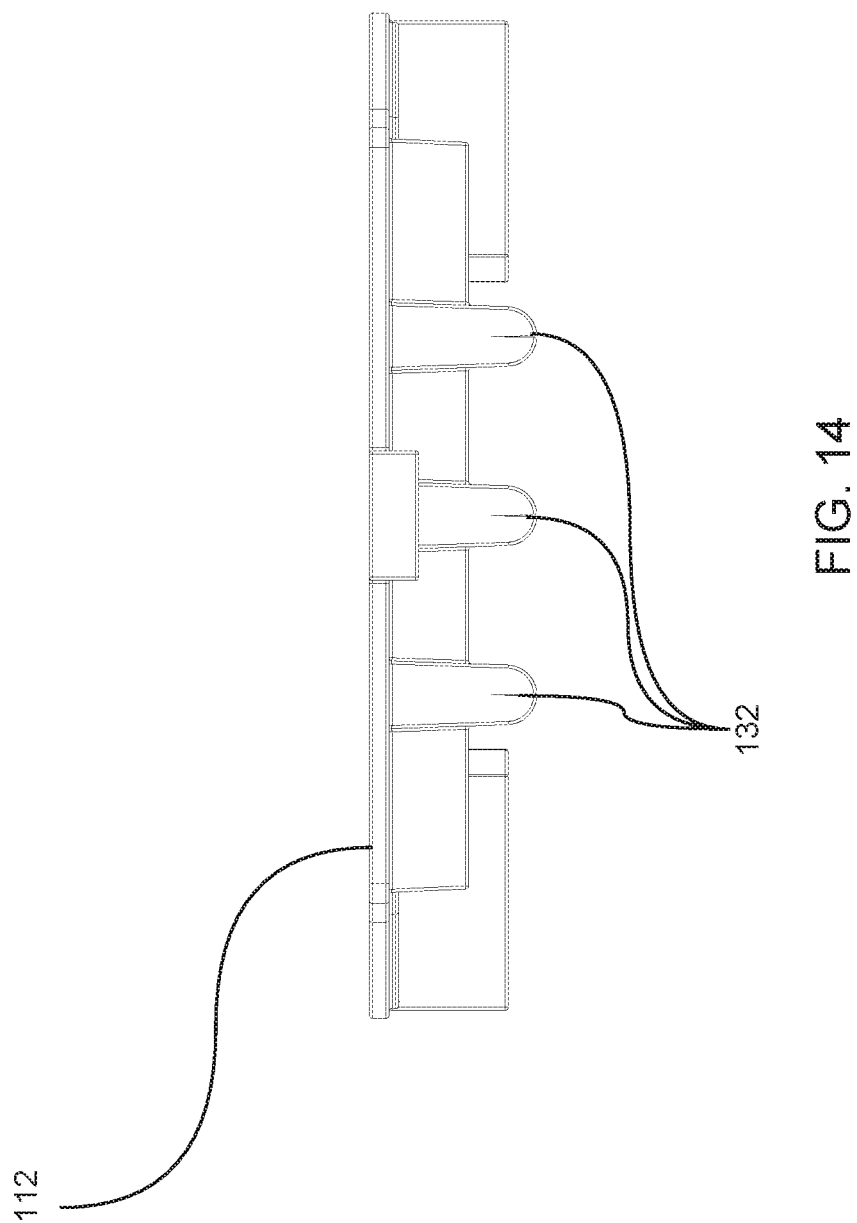
FIG. 14 illustrates a side view of a lid configured to close a hollow space located within the first annular housing of FIG. 11.

FIG. 14 depicts how lid 112 can be provided with a series of slots or notches 132, which together with the series of apertures 130 or at least one opening formed in the latch mechanism in order to form a series of passageways into the tippet control space 110. It has been appreciated that the notches are intended to hold the tippet and control the amount of tippet exiting the notches. It has been recognized that the notches perform this function particularly well if they are better able to grip the tippet material. In order to properly grip the tippet material, the lid 112 can be formed of a material having a greater coefficient of friction than the rest of the portable container 10. The greater coefficient of friction can be achieved by forming the lid of a rubber based material, or by forming the lid of a softer plastic. Alternatively, the lid and the notches can be formed of a smooth material and then provided with a strip of gripping material, i.e. a rubber strip over each of the notches which provides the additional friction.

In order to provide additional storage space, one or more expansion housings 400 and 500 can be provided between the first and second annular housings 100 and 200. These expansion housings can have a closed annular shape similar to the first and second annular housings thus forming a cavity therein, 450 and 550 respectively. The cavity can further be separated into a plurality of storage compartments via a plurality of either permanent or removable compartment walls similar to those of the first and second annular housings. Alternatively, each expansion housing can have a respective insert, 452 and 552 respectively, formed of porous material into which hooks or other accessories can be stuck and thereby retained. It will be appreciated that the end surfaces of the expansion housings will typically be provided as a flat wall to close one end of the annular side wall. This flat end wall allows the expansion housings to be flush and fit correctly between the first and second annular housings. The modular hinge system 30 can be pulled apart in order to separate the first and second annular housings, and similar hinge components can be provided on the expansion housings so as to properly mate with the corresponding hinge components on the first and second annular housings, so that the portable container 10 can then be closed and opened in a similar fashion to just the first and second annular housings.

FIGS. 7A-D depicts a portable container 10 having first and second annular housings 100 and 200 with two additional expansion housings 400 and 500 in a closed position. FIGS. 8A-C depicts how all of the components can be simultaneously opened into a flayed configuration. Alternatively each individual expansion housing or the second annular housing 200 can be selectively opened. FIGS. 9A-D depict various views of how the second annular housing can be selectively opened. FIGS. 10A-D depict various views of how the individual expansion housing 500 can be opened. FIGS. 11A-D depict various views of how the individual expansion housing 400 can be opened.

This ability to add various expansion housings is of particular use because a fisherman can have several different types of accessories that he/she may choose or want to bring fishing depending on the season, time of day, type of fish they are seeking to catch, or various other factors. It will be appreciated, for example, that fish will strike different types of flies and bait given different times of day or season. In this manner, the fisherman can keep all of their gear for a particular type of fishing, season, fish, in a separate housing. Then when the fisherman wishes to go fishing for a particular type of fish or in a particular season, the fisherman need only select the applicable expansion housings containing the appropriate gear, the expansion housing can then be placed between the first and second annular housings and the modular hinge system will mesh and make the portable container customized for that particular fishing trip.

In some embodiments an insert can be provided in any or all of the hollow spaces described herein. As discussed above the insert can be a porous material for sinking hooks into and thereby holding them, in yet other embodiments the inserts can be provided as drying pads which can be made out of cotton or any other material known in the art for drying fishing flies and lures.

When using an artificial fly, in some cases it is advantageous to present a fly that is floating on the water. When the material of the fly becomes wet, the fishing fly does not float as well, thus drying the fly can be advantageous. It is also convenient to dry a fly before placing it into a compartment for storage. Drying the fly, lure, or hook also helps prevent rust. Drying pads can be secured to into the annular housings 100 or 200, as well as the expansion housings 400 and 500 with a hook and loop fastener, such as Velcro, or with any adhesive commonly used in the art. In some embodiments, the drying pad is replaceable while in other embodiments, the drying pad is permanently fixed to the container.

Figure 12A:
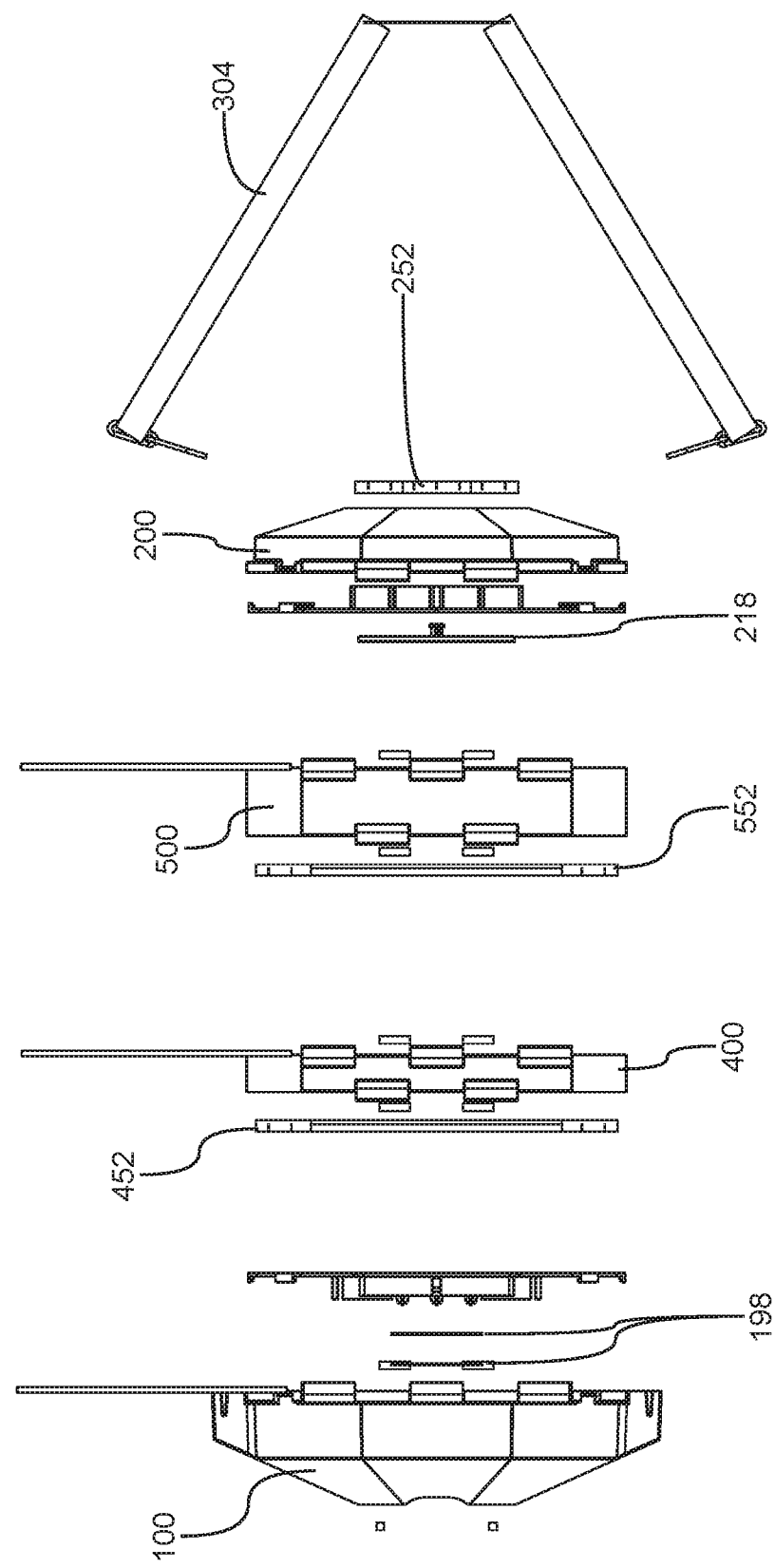

FIGS. 12A-C depict a various side top and perspective exploded views of the portable container 10.

In some embodiments, the expansion components 400 and 500 can comprise a singular concave compartment or hollow space contained therein. In other embodiments, the expansion component can include a plurality of compartments. In yet additional embodiments, the expansion component can act as a spacer, having no compartments but only an annular side wall. It is contemplated herein, that the compartment(s) of the expansion component can take on any size and/or shape, in any combination, and still be consistent with what is described above for the first and second components.

A method of using and carrying the portable container 10 is also contemplated herein wherein a user supports a harness about the user's person. The user then clips a portable container as described above to the harness with the second annular housing against the user's chest. In this manner the straps of the harness extend past the second annular housing and hold the tabs of the first annular housing thus pinching the portable container in the closed position. When access to the portable container is desired, the portable container 10 can be rotated 180 degrees about an axis through the tabs such that the second annular housing faces away from the body and the hinge mechanism faces upwards. The portable container can then be opened by releasing the latch mechanism and rotating the second annular housing about the modular hinge system in a downward position. In addition, prior to opening, after rotating, the tippet control system will be viewable from the top by the user when the second annular housing is rotated away from the user's body thus allowing the user to easily see and choose the appropriate tippet size.

Yet another method of using a portable container as discussed herein is contemplated. This method includes; placing at least one spool of a tippet material into a portable container, wherein the portable container is configured so as to have a hollow space for containing the spool of tippet and a passageway formed therein suitable for accepting one or more spools of tippet material, the portable container further defining one or more apertures which form one or more passageways from inside the hollow space to an exterior of the portable container which allows for a portion of the tippet to extend from the hollow space and protrude beyond an outer surface of the portable container; unspooling an amount of tippet material sufficient to span the length of the hollow space and channel; and guiding the tippet material through a restrictive surface and out the aperture. This additional method can further include placing at least one circular disk on each side of the spool of tippet material; providing keyed circular disks so as to prevent the rotation of one spool of tippet material from imparting rotation to an adjacent spool of tippet material; and supporting the portable container about the chest of an intended user.

As discussed above, this additional method can further include orienting the one or more apertures forming a passageway for the tippet material so as to cause the tippet material to protrude from the portable container in a direction being toward the face of the user.

While several embodiments have been described herein that are exemplary of the present invention, one skilled in the art will recognize additional embodiments within the spirit and scope of the invention. Modification and variation can be made to the disclosed embodiments without departing from the scope of the disclosure. Those skilled in the art will appreciate that the applications of the embodiments disclosed herein are varied. Accordingly, additions and modifications can be made without departing from the principles of the disclosure. In this regard, it is intended that such changes would still fall within the scope of the disclosure. Therefore, this disclosure is not limited to particular embodiments, but is intended to cover modifications within the spirit and scope of the disclosure.

What is claimed is:
1. A portable container, comprising:
   a first housing having a perimeter side wall, the perimeter side wall being closed at a first end and open at a second end, the first housing being configured so as to define a plurality of hollow spaces therein;
   a harness system, being wearable by a user, wherein the harness system is configured to attach about the perimeter side wall of the first housing, wherein the harness system is configured to retain the housing such that the first end of the perimeter sidewall of the first housing rests against a chest portion of the user;

a second housing having a perimeter side wall corresponding in shape to the perimeter sidewall of the first housing, the perimeter side wall of the second housing being closed at a second end and open at a first end, the second housing being pivotably connected to the first housing via a hinge system, the second housing being configured so as to define at least one additional hollow space;

a stop system being operable with the hinge system;

wherein the first housing and the second housing fold into a closed position being defined by a configuration wherein the second end of the first housing and the first end of the second housing face one another and substantially close one another;

wherein the first housing and the second housing pivot away from one another to define an open position in order to expose their respective open second and first ends, thus providing access to the one or more hollow spaces contained therein;

wherein the stop system is configured to limit a rotational distance the second housing can rotate away from the first housing such that the second housing can rest in a position being non-parallel to a front surface of the user's chest in the open;

wherein the hinge system is positioned at a bottom edge of the first housing and the second housing in the closed position;

wherein the first and second housings are provided with a respective latch component about upper respective distal edges being configured to operate with one another and being configured to secure the first and second housings in the closed position; and wherein the latch component located about the first housing is provided with an opening which provides a passageway into the at least one hollow space of the first housing which contains one or more spools configured to receive a tippet material.

2. The portable container of claim 1, further comprising an expansion housing pivotably connected to both the first housing and the second housing, the expansion housing being positioned between the first housing and the second housing in the closed position.

3. The portable container of claim 2, wherein the expansion housing is configured so as to define at least one hollow space therein.

4. The portable container of claim 2, wherein the expansion housing includes an insert configured to hold and organize a plurality of fishing accessories.

5. The portable container of claim 1, further comprising a tippet control system provided within the first housing or the second housing, the tippet control system including a plurality of spools configured to receive a tippet material, wherein the tippet control system further comprises at least one circular disk placed between each of the plurality of spools.

6. The portable container of claim 5, wherein the at least one circular disk is keyed so as to prevent the spinning of one spool from imparting rotation to an adjacent spool.

7. The portable container of claim 1, further comprising a plurality of closeable lids provided to each of the hollow spaces provided in each of the first and second housings, the closeable lids each being provided with a latching mechanism about an outer circumference of their respective edges which operates to latch with corresponding latch components located about the outer circumference of their respective housings.

8. The portable container of claim 1, further comprising a plurality of protrusions provided on a first edge of the first housing and a plurality of protrusions provided on a second opposing edge of the first housing, wherein a piece of substantially rigid material spans the distance between the protrusions thus forming at least one pair of slots, being on opposing edges of the first housing, the slots being configured to receive a portion of the harness system configured to be worn by the user.

9. The portable container of claim 1, wherein the stop system is integrated into the modular hinge system, wherein the stop system prevents the first and second housings from opening to a relative angle wherein a normal plane of the first end of the second housing is substantially perpendicular to a vertical axis passing through the user.

10. A method of utilizing a portable container, the method comprising:

providing a portable container, comprising:

a first housing having a perimeter side wall, the perimeter side wall being closed at a first end and open at a second end, the first housing being configured so as to define a plurality of hollow spaces therein;

a harness system, being wearable by a user, wherein the harness system is configured to attach about the perimeter side wall of the first housing, wherein the harness system is configured to retain the housing such that the first end of the perimeter sidewall of the first housing rests against a chest portion of the user;

a second housing having a perimeter side wall corresponding in shape to the perimeter sidewall of the first housing, the perimeter side wall of the second housing being closed at a second end and open at a first end, the second housing being pivotably connected to the first housing via a hinge system, the second housing being configured so as to define at least one additional hollow space;

a tippet control system provided within the first housing or the second housing, the tippet control system including a plurality of spools configured to receive a tippet material, wherein the tippet control system further comprises at least one circular disk placed between each of the plurality of spools;

a stop system being operable with the hinge system;

wherein the first housing and the second housing fold into a closed position being defined by a configuration wherein the second end of the first housing and the first end of the second housing face one another and substantially close one another;

wherein the first housing and the second housing pivot away from one another to define an open position in order to expose their respective open second and first ends, thus providing access to the one or more hollow spaces contained therein;

wherein the stop system is configured to limit a rotational distance the second housing can rotate away from the first housing such that the second housing can rest in a position being non-parallel to a front surface of the user's chest in the open; and wherein the hinge system is positioned at a bottom edge of the first housing and the second housing in the closed position;

placing the harness upon the user;

positioning the portable container such that the first end of the first housing is against a chest portion of the user;

alternating from the closed position to the open position by rotating the second housing away from the first housing until the stop assembly engages, wherein the stop assembly engages at a rotational angle being less than 180 degrees from the closed position.

11. The method of utilizing a storage container of claim 10, wherein the stop assembly engages at rotational angle representing a perpendicular angle between the first end of the second housing and a vertical axis passing through the user while the user is in a standing position.

12. The method of utilizing a storage container of claim 10, further comprising:
placing one or more spools of tippet material within the one or hollow spaces provided within the first housing or the second housing.

13. The method of utilizing a storage container of claim 12, further comprising:
extending an end of the tippet material contained within the one or hollow spaces provided within the first housing or the second housing through one or more apertures provided through the perimeter sidewall of the first housing or the second housing.

14. The method of utilizing a storage container of claim 10, further comprising:
providing an expansion housing having one or more hollow spaces provided therein between the first and the second housing.

15. A portable container, comprising:
a first housing having a perimeter side wall, the perimeter side wall being closed at a first end and open at a second end, the first housing being configured so as to define a plurality of hollow spaces therein;
a harness system, being wearable by a user, wherein the harness system is configured to attach about the perimeter side wall of the first housing, wherein the harness system is configured to retain the housing such that the first end of the perimeter sidewall of the first housing rests against a chest portion of the user;
a second housing having a perimeter side wall corresponding in shape to the perimeter sidewall of the first housing, the perimeter side wall of the second housing being closed at a second end and open at a first end, the second housing being pivotably connected to the first housing via a hinge system, the second housing being configured so as to define at least one additional hollow space;
a stop system being operable with the hinge system;
one or more expansion housings pivotably connected to both the first housing and the second housing via the hinge system;
wherein the first housing and the second housing fold into a closed position being defined by a configuration wherein the second end of the first housing and the first end of the second housing face one another and substantially close one another;
wherein the first housing and the second housing pivot away from one another to define an open position in order to expose their respective open second and first ends, thus providing access to the one or more hollow spaces contained therein;
wherein the stop system is configured to limit a rotational distance the second housing can rotate away from the first housing such that the second housing can rest in a position being non-parallel to a front surface of the user's chest in the open;
wherein the hinge system is positioned at a bottom edge of the first housing and the second housing in the closed position; and
wherein the one or more expansion housings are positioned between the first housing and the second housing in the closed position
wherein the first and second housings are provided with a respective latch component about upper respective distal edges being configured to operate with one another and being configured to secure the first and second housings in the closed position; and
wherein the latch component located about the first housing is provided with an opening which provides a passageway into the at least one hollow space of the first housing which contains one or more spools configured to receive a tippet material.

* * * * *